(12) United States Patent
Merkley, Jr. et al.

(10) Patent No.: US 7,904,332 B1
(45) Date of Patent: Mar. 8, 2011

(54) INTEGRATED FINANCIAL PROCESSING SYSTEM AND METHOD FOR FACILITATING AN INCENTIVE PROGRAM

(75) Inventors: John Eugene Merkley, Jr., West Des Moines, IA (US); Sheila Denise Jesse Oliver, West Des Moines, IA (US); Greg Alan Unruh, Clive, IA (US); Roby Christian Shay, Urbandale, IA (US); Timothy Dale Unruh, Urbandale, IA (US); Chad Joseph Pinter, Visalia, CA (US); Daniel Michael DaLuga, Urbandale, IA (US); David Michael Kahle, West Des Moines, IA (US); Matthew Lowell McBurney, West Des Moines, IA (US); Jason Olaf Britton, Tucson, AZ (US)

(73) Assignee: Deere & Company, Moline, IL (US)

( * ) Notice: Subject to any disclaimer, the term of this patent is extended or adjusted under 35 U.S.C. 154(b) by 1220 days.

(21) Appl. No.: 10/667,851

(22) Filed: Sep. 22, 2003

Related U.S. Application Data

(60) Provisional application No. 60/439,572, filed on Jan. 10, 2003.

(51) Int. Cl.
*G07G 1/00* (2006.01)
(52) U.S. Cl. .................. 705/14.1; 705/1; 705/7; 705/35; 705/14.11; 705/14.15; 705/14.17
(58) Field of Classification Search .................. 705/1, 7
See application file for complete search history.

(56) References Cited

U.S. PATENT DOCUMENTS

| 5,576,951 A | 11/1996 | Lockwood | ..................... 395/227 |
| 6,289,319 B1 | 9/2001 | Lockwood | ..................... 705/35 |

(Continued)

FOREIGN PATENT DOCUMENTS

WO       WO 01/46871       *  6/2001

OTHER PUBLICATIONS

Aaker, David A., Kumar, V., Day, George S. Marketing Research, 7th ed. John Wiley & Sons, Inc. 2001. pp. 689-693.*

(Continued)

*Primary Examiner* — Kambiz Abdi
*Assistant Examiner* — Sarah M Monfeldt

(57) ABSTRACT

A library of available incentive programs is established for an agricultural product. Input is accepted from an agricultural producer or a crop planner to facilitate tailoring the library of incentive programs to the requirements (e.g., needs, objectives, and resources) of a particular producer. The library of available incentive programs is searched based upon the accepted input to select a tailored list of candidate incentive programs from the library. Information on the tailored candidate incentive programs is made accessible to the agricultural producer. The agricultural producer may select a preferential incentive program between or among the candidate incentive programs. Further, the producer may readily seek financing via electronic communications to purchase or otherwise conduct a transaction under the preferential incentive program. If the producer applies for a financial product for financing the transaction under the preferential incentive program, the previously gathered input (e.g., background data on the particular producer) is transferred to a financial screening process to reduce duplicative reentry of data and to reduce or eliminate potential clerical errors.

33 Claims, 45 Drawing Sheets

U.S. PATENT DOCUMENTS

| | | | |
|---|---|---|---|
| 7,603,284 B2 * | 10/2009 | Stroman et al. | 705/7 |
| 2001/0032178 A1 | 10/2001 | Adams et al. | |
| 2001/0047307 A1 * | 11/2001 | Bennett et al. | 705/26 |
| 2002/0077867 A1 * | 6/2002 | Gittins et al. | 705/4 |
| 2002/0082963 A1 | 6/2002 | Corvin | |
| 2003/0041019 A1 | 2/2003 | Vagim, III et al. | |
| 2003/0125973 A1 | 7/2003 | Mathews et al. | |
| 2003/0163401 A1 * | 8/2003 | Dines et al. | 705/35 |
| 2004/0059658 A1 | 3/2004 | Sosville | |
| 2004/0215556 A1 * | 10/2004 | Merkley et al. | 705/38 |
| 2005/0222906 A1 | 10/2005 | Chen | |

OTHER PUBLICATIONS

Augustinos I. Dimistras, Theodore Petropoulos and Isabella Constantinidou. "Multi-criteria Evaluation of Loan Applications in Shipping". Journal of Multicriteria Decision Analysis; Jul.-Oct. 2002; 11, 4-5; ABI/INFORM Global; pp. 237-246. (10 pages from ProQuest).

Bryan E. Milling. "Bank Credit Criteria: Who Gets a Loan?". Agency Sales; Jul. 1989; 19, 7; ABI/INFORM Global pp. 26-28. (3 pages from ProQuest).

\* cited by examiner

| Home | My Services | About Us | FAQ | Partners | Log Out |

Search Criteria

Program Type: [All ▽]   Season: [All ▽]   State: [All ▽]

Available Program Sponsors
Sponsor Company A
Sponsor Company B
Sponsor Company C
Sponsor Company D

[Add Selected △]
[▽ Remove Selected]

Selected Program Sponsors

Available Product Types
Additive
Equipment
Feed
Fertilizer

[Add Selected △]
[▽ Remove Selected]

Selected Product Types

Available Crop Types
Barley
Corn
Hay
Oats

[Add Selected △]
[▽ Remove Selected]

Selected Crop Types

Product Description:
Separate multiple search items with a comma

[Clear Selections]   [Find Program]

Fig. 6

| Home | My Services | About Us | FAQ | Partners | Log Out |

Search Results

Sort by: Program ▷

| Program Sponsor | Product Type | Program Name | Crop Type | Season |
|---|---|---|---|---|
| Sponsor Company A | Herbicide, Insecticide | Program A | Corn, Soybeans | 2002 |
| Sponsor Company A | Herbicide | Program A1 | Corn, Soybeans | 2002 |
| Sponsor Company A | Herbicide | Program A2 | Corn, Soybeans | 2002 |
| Sponsor Company A | Herbicide, Seed | Program A3 | Corn | 2002 |
| Sponsor Company B | Additive, Herbicide | Program B1 | Corn, Soybeans | 2002 |
| Sponsor Company B | Additive, Herbicide | Program B2 | Corn, Soybeans | 2003 |
| Sponsor Company C | Seed | Program C | Corn | 2002 |
| Sponsor Company D | Seed | Program D1 | Corn | 2002 |
| Sponsor Company D | Seed | Program D2 | Corn | 2002 |
| Sponsor Company D | Seed | Program D3 | Corn | 2002 |
| Sponsor Company E | Seed | Program E1 | Corn | 2002 |
| Sponsor Company E | Seed | Program E2 | Corn | 2002 |
| Sponsor Company F | Herbicide, Seed | Program F1 | Corn | 2002 |
| Sponsor Company F | Seed | Program F2 | Corn | 2002 |
| Sponsor Company F | Seed | Program F3 | Corn | 2002 |

Showing 1-15 of 19

New Search

Fig. 7A

| Home | My Services | About Us | FAQ | Partners | Log Out |

Search Results

Sort by: Program ▽

| Program Sponsor | Product Type | Program Name | Crop Type | Season |
|---|---|---|---|---|
| Sponsor Company G | Seed | Program G | Corn, Soybeans | 2002 |
| Sponsor Company H | Seed | Program H | Corn, Soybeans | 2002 |
| Sponsor Company I | Seed | Program I1 | Corn | 2002 |
| Sponsor Company I | Seed | Program I2 | Corn | 2002 |

Showing 16-19 of 19

[New Search]

Fig. 7B

| Home | My Services | About Us | FAQ | Partners | Log Out |

Program Details

Program F1

Eligibility:
- Customers who choose to purchase both their seed and crop protection products may qualify for Program F1.

Rate:
- Prime minus 2.5% Variable
- Availabe through John Deere Credit

Deadlines:
- Application and Seed order deadline: March 1, 2002
- Chemical purchase deadline: July 31, 2002

Minimum Purchase seed and crop protection:
- $15,000 Minimun Company Q seed order
- $10,000 Minimun purchase Sponsor Company F Crop Protection products (listed below)

Notes:
- Early Pay offered on seed purchases only
  ○ Early Pay deadline dates apply.

Eligible Crop Protection Products:
- Product Tradename R
- Product Tradename S

Fig. 8A

| Fig. 8A |
| Fig. 8B |

Fig. 8

- Product Tradename T
- Product Tradename U
- Product Tradename V
- Product Tradename W
- Product Tradename X
- Product Tradename Y
- Product Tradename Z Program Type: Financing John Deere Credit Company F Finance Product - Seed and Chemical Purpose: Crop Input Financing
Minimun finance amount: $25,000
Rate Information: Prime - 2.5%
Payment Due Information:
Application Deadline: 12/15/2002
Early Payment Applies
Early Pay Schedule: 03/01/2002

John Deere Credit

[Apply]

[Back]   [New Search]

Fig. 8B

| Home | My Services | About Us | FAQ | Partners | Log Out |

My Applications
New Application
Change Password

Demographic Information
* indicates required fields

Business Structure: [C-Corporation ▽]*
Legal Business Name: [Company M ▽]*
Business Address 1: [1 Main St]*
Business Address 2: [ ]
Business City: [Urbandale]*
Business State: [Iowa ▽]*
Business Zip Code: [50322]*
Business County: [Polk]*
Country: [United States ▽]*
Federal Tax ID: [xx-xxxxxxx]
E-mail Address: [CompanyM@aol.com]*
Business Phone Number: [xxx-xxx-xxxx]*
Years At Current Business Address: [19]*

---

Primary Owner

First Name: [John]*
Middle Initial: [ ]

Fig. 9A

| Fig. 9A |
| Fig. 9B |

Fig. 9

| | |
|---|---|
| Last Name: | Doe * |
| Suffix: | ▷ |
| Date of Birth: | June ▷  5 ▷  1972 ▷ * |
| Social Security Number: | XXX-XX-XXXX |
| Is the applicant a U.S. Citizen: | Yes ▷ * |
| Percent Owned: | 25 % * |
| Home Address | ☐ |
| Same as Business Address: | |
| Home Address 1: | 1 Easy St * |
| Home Address 2: | |
| Home City: | Urbandale * |
| Home State: | Iowa ▷ * |
| Home Zip Code: | 50322 * |
| Home Phone Number: | XXX-XXX-XXXX * |
| E-mail Address: | JohnDoe@mail.com |

Number of Additional Owners?: 0 ▷

Please check all your information, then click "Continue".

Continue ▷     Save and Finish Later

All loans subject to established credit qualifications. This service is not available to residents of the states of KS and NE.

| Home | My Services | About Us | FAQ | Partners | Log Out |

My Applications
New Application
Change Password

Demographic Information

\* indicates required fields

Business Structure: [Sole Proprietorship ▽] \*
Country: [United States ▽] \*
Is the Applicant a U.S. Citizen: [Yes ▽] \*
First Name: [John] \*
Middle Initial: [ ]
Last Name: [Doe] \*
Suffix: [ ▽]
Address 1: [1 Easy St] \*
Address 2: [ ]
City: [Urbandale] \*
State: [Iowa ▽] \*
Zip Code: [50322] \*
County: [Polk] \*
Business Phone Number: [XXX-XXX-XXXX] \* Ext.: [111]
Social Security Number: [XXX-XX-XXXX]
Date of Birth: [June ▽] [5 ▽] [1972 ▽] \*
E-mail Address: [JohnDoe@mail.com]
Years At Current Residence: [19] \*
Is there a co-applicant on this request: [No ▽]

[Continue ▷]   [Save and Finish Later]

All loans subject to established credit qualifications. This service is not available to residents of the states of KS and NE.

Fig. 11

| Home | My Services | About Us | FAQ | Partners | Log Out |

My Applications
New Application
Change Password

Loan Application          * indicates required fields

Purpose of Loan          [Equipment ▷] *
Total Selling Price      [100000] *
Cash Down Payment        [25000]
Trade-in Allowance       [0]
Amount Requested         [75000] *
Payment Frequency        [Annual ▷] *
Year Started Farming     [1985] *
Major Crop               [Corn ▷] *
       Equipment Make    Equipment Category
       John Deere        Combines & Harvesting Equipment    Edit
                         [Add Equipment]                    [Enter]

Income Information
Gross Farm Income        [500000] *
Non-Farm Income 1        [0] *
1 Alimony, child support, or separate maintenance need not be disclosed unless relied upon for credit.
Balance Sheet Information
Total Assets             [1000000] *
Total Liabilities        [200000] *

[Continue ▷]         [Save and Finish Later]

All loans subject to established credit qualifications. This service is not available to residents of the states of KS and NE.

| Home | My Services | About Us | FAQ | Partners | Log Out |

Testing JDC Equipment Loan

Lender Profile
Product Maintenance
View/Assign Zip Codes
Product Criteria
Edit Users Applicant Is: [Select an Entity ▷]
Country: [Select One ▷]
Is the Applicant a U.S. Citizen: [Select One ▷]
State: [Select a State ▷]
Zip Code: [ ]
Date of Birth: [ / / ] mm/dd/yyyy
Is there a Co-Applicant: [Select One ▷]
Credit Score: [0]
Has the Applicant filed for bankruptcy: [Select One ▷]
Time at Residence: [Select One ▷]

Loan Information

Selling Price [0]
Loan Amount Requested [0]
Years in Business [0]
Major Crop [Select One ▷]
Equipment Category [Select One ▷]

Fig. 12A

| Fig. 12A |
| Fig. 12B |

Fig. 12

Equipment Make [Select One ▷]
Is the Equipment Used? [Select One ▷]
What will the equipment be used for? [Select One ▷]
Will the Equipment be used for Custom Work? [Select One ▷]

Income Information

Gross Farm Income [0]
Income [0]
Net Worth [0]

Balance Sheet Information

Total Assets [0]
Total Liabilities [0]

[Display Results] [Clear All] [Close]

All loans subject to established credit qualifications. This service is not available to residents of the states of KS and NE.

Fig. 12B

| Home | My Services | About Us | FAQ | Partners | Log Out |

Supplemental Questions for "JDC Equipment Loan"

Lender Profile
Product Maintenance
View/Assign Zip Codes
Product Criteria
Edit Users Supplemental Question
Category [ Equipment ▷ ]

Question                                    Select all:

Equipment Description
Equipment Model #
Equipment Serial #
Equipment Year
Current Equipment Hours
Trade-in Make
Trade-in Description
Trade-in Model #
Trade-in Serial #
Trade-in Year
Current Hours on trade-in
Payoff Lender Name
Payoff Phone Number

Fig. 13A

| Fig. 13A |
| Fig. 13B |

Fig. 13

Payoff Account Number
Seller Name
Seller Contact
Address
City
State
Zip
Phone Number
Fax Number
Seller Number
Seller Branch Number
Seller Email Address Save   Close All loans subject to established credit qualifications. This service is not available to residents of the states of KS and NE.

Fig. 13B

| Home | My Services | About Us | FAQ | Partners | Log Out |

Supplemental Questions for "JDC Equipment Loan"

Lender Profile
Product Maintenance
View/Assign Zip Codes
Product Criteria
Edit Users Supplemental Question
Category [Personal ▽]

Question
_____     Select all: ___

Additional Loan Request Info.
Select a Maturity Date
_____

Additional Applicant Info.
Marital Status
If Married, Spouse's First Name
If Married, Spouse's Middle Initial
If Married, Spouse's Last Name
If Married, Spouse's Suffix
If Married, Spouse's Social Security Number
If Married, Spouse's Birth Date
Rent or Own Current Residence

| Fig. 14A |
| Fig. 14B |
| Fig. 14C |

Rent or own business address
Number of Dependents
Is the applicant a co-maker, co-signer, or guarantor on any loans
Are there any unsatisfied judgements against you
Are any accounts past due, in default or dispute
Is the applicant obligated to pay alimony, child support, or separate maintenance
Do you lease any machinery or equipment
Do you sell any products under other names
Are there any liens on your crops
Is the applicant a defendent in any pending lawsuit
Has the applicant ever filed for any chapter of bankruptcy
If employed elsewhere, employer name
If employed elsewhere, employer phone
Does the applicant own any livestock
Does the applicant lease any machinery or equipment
Checking account balance
Net Farm Income
Does the applicant have any crop insurance Primary Bank Info
Bank Name
Contact Last Name
Contact First Name
Phone Number

Fig. 14B

City
State
Do you have a checking or savings account or both
Do you have a major credit card
    Primary Credit Reference
Finance Company Name
Contact Name
Address
Phone Number
City
State
    Additional Company Info.
Inception Date
Incorporation Date
Signing Officer's First Name
Signing Officer's Middle Initial
Signing Officer's Last Name
Signing Officer's Suffix
Officer's title
Organization ID
State of Organization
State of Chief Executive Officer

[ Save ]  [ Close ]

All loans subject to established credit qualifications. This service is not available to residents of the states of KS and NE.

Fig. 14C

| Home | My Services | About Us | FAQ | Partners | Log Out |

My Applications
New Application
Change Password

Application Review

Demographic Information

| | |
|---|---|
| Name | John Doe |
| Business Structure | Sole Proprietorship |
| US Citizen | Yes |
| Address | 1 Easy St |
| | Urbandale, IA Polk 50322 |
| Country | USA |
| Years At Current Residence | 19 |
| Work Phone | XXX-XXX-XXXX Ext:111 |
| Social Security Number | XXX-XX-XXXX |
| Birth Date | 6/5/1972 |
| E-mail | JohnDoe@mail.com |

[ Edit ]

Loan Information

| | |
|---|---|
| Application Number | 1928 |
| Purpose of Loan | Equipment |
| Selling Price | $100,000.00 |
| Down Payment | $25,000.00 |

Fig. 15A

| Fig. 15A |
|---|
| Fig. 15B |

Fig. 15

| | |
|---|---|
| Amount Requested | $75,000.00 |
| Payment Frequency | Annual |
| Year Started Farming | 1985 |
| Major Crop | Corn |
| Gross Farm Income | $500,000.00 |
| Non-Farm Income | $0.00 |
| Total Assets | $1,000,000.00 |
| Total Liabilities | $200,000.00 |

| Equipment Category | Manufacturer | Is the Equipment New or Used | Intended use | Is the equipment used for Custom Work |
|---|---|---|---|---|
| Combines & Harvesting Equipment | John Deere | New | Agricultural | No |

Edit

Please click on submit only once. This process could take several minutes depending on you connection speed.

Submit    Print

All loans subject to established credit qualifications. This service is not available to residents of the states of KS and NE.

Fig. 15B

| Home | My Services | About Us | FAQ | Partners | Log Out |

My Applications
New Application
Change Password

Application Complete

Thank you for completing the online application process Your application is being submitted. You will be contacted if additional information is required to complete the process.

Your application number is: 1298

If you have any questions or comments about iVesta Financial Solutions, please email us at ops@ivestafinancial.com or phone us at 1.877.7iVesta (877.748.3782), Monday thru Friday, 8:00 AM to 5:00 PM, Central Time.

[ Home ]

All loans subject to established credit qualifications. This service is not available to residents of the states of KS and NE.

Fig. 16

We expect you to receive approval for the following 3 offers. Just click "Accept Offer" to pursue an offer. To get more information about an offer, click on its "Details."

Term Loan

| Lender | Product | Amount | Interest Rate | Months | Details | |
|---|---|---|---|---|---|---|
| iVesta Test Lender | iVesta Test Product-Auto Term Note | $75,000.00 | 6.65%-7.25% | ▷ | ◯ Details | Accept Offer |
| Deere Credit Inc. | JDC Equipment Loan | $75,000.00 | 7.50%-9.50% | ▷ | ◯ Details | Accept Offer |

Lease
Lease Payments are calculated for a Payment Frequency of annual unless noted otherwise.

| Lessor | Product | Amount | Months | Buyout Option | *Payment | Details | |
|---|---|---|---|---|---|---|---|
| iVesta Test Lender | iVesta Test Product-Lease | $75,000.00 | ▷ | ▷ | $0.00 | ◯ Details | Accept Offer |

Not Interested   Save and Review Later

*Lease Payments are an estimate.

All loans subject to established credit qualifications. This service is not available to residents of the states of KS and NE.

Fig. 17B

| Home | My Services | About Us | FAQ | Partners | Log Out |

Offer Transition

My Applications
New Application
Change Password

John Deere Credit    This is John Deere Credit's marketing text.

Thank You for choosing Deere Credit Inc.

Summary of Terms
The following summarizes the next steps involved with obtaining this financing.
A John Deere Credit representative will be in contact with you to complete the loan order for closing.

Terms & Conditions
The following are the 'Terms and Conditions' for this product.
A first lien will be taking on the equipment purchased.

Continue ▷

All loans subject to established credit qualifications. This service is not available to residents of the states of KS and NE.

Fig. 18

| Home | My Services | About Us | FAQ | Partners | Log Out |

Product Criteria

Lender Profile
Product Maintenance
View/Assign Zip Codes
Product Criteria
Edit Users Loan Type: [Equipment ▽]

| | Pass/Fail Criteria | Score Criteria | Criteria Weights | Test Score | Offer Text | Supplement Questions |
|---|---|---|---|---|---|---|
| JDC Equipment Loan | [Edit] | [Edit] | [Edit] | [Edit] | [Edit] | [Edit] |

[Close]

All loans subject to established credit qualifications. This service is not available to residents of the states of KS and NE.

Fig. 19

| Home | My Services | About Us | FAQ | Partners | Log Out |

"JDC Equipment Loan" Credit Product Details

*Indicates required fields. Dates need to be in (mm/dd/yyyy) format.
No '$', '%', or commas Lender Profile
Product Maintenance
View/Assign Zip Codes
Product Criteria
Edit Users Application Type: [Equipment ▽] *
Product Type: [Term Loan ▽] *
Product Name: [JDC Equipment Loan]
Lender Product Code: [            ]
Approval Type: [Pending ▽] *
Interest Type: [Fixed ▽] *
Interest Rate Range: Based On: [Fixed Values]
*Current Prime Rate: 4.75%    [7.5] Min [9.5] Max Term (Months): [6] Min [60] ▽ Max
Product Effective Date: [Start] [End]
Additional Terms: [Add Additional Terms]
Is this product associated with a program incentive? [No ▽] *

[Save]   [Close]

All loans subject to established credit qualifications. This service is not available to residents of the states of KS and NE.

Fig. 20

| Home | My Services | About Us | FAQ | Partners | Log Out |

Pass/Fail Criteria for "JDC Equipment Loan" Credit Product

Lender Profile
Product Maintenance
View/Assign Zip Codes
Product Criteria
Edit Users

[ Save ]   [ Close ]

Pass/Fail Minimum/Maximum

Check a minimum field to specify a minimum allowable value.
Check a maximum field to specify a maximum allowable value.
Check both fields to specify an allowable range.

| Pass/Fail Criteria | Minimum | | Maximum | |
|---|---|---|---|---|
| | | | | Select all Minimums |
| | | | | Deselect all |
| Requested Amount | ☑ | 1000 | ☑ | 1000 |
| Years in Farming | ☐ | 0 | ☐ | 0 |
| Gross Farm Income | ☐ | 0 | ☐ | 0 |
| Total Assets | ☐ | 0 | ☐ | 0 |
| Net Worth | ☐ | 0 | ☐ | 0 |
| | | | | Select all Maximums |
| | | | | Deselect all |

Fig. 21A

| Fig. 21A |
| Fig. 21B |
| Fig. 21C |
| Fig. 21D |
| Fig. 21E |
| Fig. 21F |
| Fig. 21G |

Fig. 21

Years at Current Address
Age of Applicant
Debt Ratio
Debt/Equity Ratio
Income
Loan Request/Net Worth
% Loan to Value
Credit Bureau Score Pass/Fail Exclude
Check a field to exclude loans.
e.g. Refuse loans where the applicant has had a bankruptcy.

| Pass/Fail Criteria | Exclude | Select all Excludes<br>Deselect all |
|---|---|---|
| Applicant is not a US citizen | ☑ | |
| Applicant does not live in US | ☑ | |
| Equipment is used | ☐ | |
| Equipment is new | ☐ | |
| Equipment is used for custom work | ☐ | |
| There is a co-applicant | ☐ | |
| Applicant has had a bankruptcy | ☐ | |

Equipment Categories
Check a field to include equipment categories.
e.g. Accept loans for tractors.

Fig. 21B

| Equipment Category | Include | Select all Categories |
|---|---|---|
| | | Deselect all Categories |
| Antique Farm Equipment | ☑ | |
| Combines & Harvesting Equipment | ☑ | |
| Cotton Equipment | ☑ | |
| Dairy Equipment | ☑ | |
| Field Tillage Equipment | ☑ | |
| Grain Handling Equipment | ☑ | |
| Hay & Forage Equipment | ☑ | |
| Industrial/Heavy Equipment | ☑ | |
| Irrigation Equipment | ☑ | |
| Lawn & Garden | ☑ | |
| Livestock Equipment | ☑ | |
| Other | ☑ | |
| Planting & Seeding Equipment | ☑ | |
| Rotary Cutters/Shredders | ☑ | |
| Skid-Steer Loaders | ☑ | |
| Sprayers/Fertilizer Equipment | ☑ | |
| Tractors | ☑ | |
| Trucks & Trailers | ☑ | |
| Utility Vehicles | ☑ | |
| Wagons & Carts | ☑ | |

Equipment Use

Fig. 21C

Check a field to include equipment usages.
e.g. Accept loans for agricultural equipment.

| Equipment Use | Include | |
|---|---|---|
| Agricultural | ☑ | Select all Uses |
| Other Commercial | ☑ | Deselect all Uses |

Equipment Make

Check a field to include equipment manufacturers.
e.g. Accept loans for John Deere equipment.

| Equipment Make | Include | |
|---|---|---|
| Agco | ☑ | Select all |
| Allied | ☑ | Manufacturers |
| Allis Chalmers | ☑ | Deselect all |
| Arts Way | ☑ | Manufacturers |
| Badger | ☑ | |
| Better Built | ☑ | |
| Case | ☑ | |
| Case-IH | ☑ | |
| Claas | ☑ | |
| Deutz | ☑ | |
| Fendt | ☑ | |
| Ford | ☑ | |
| Ford NH | ☑ | |

Fig. 21D

- ☑ Gehl
- ☑ Great Plains
- ☑ Hesston
- ☑ International Harvester
- ☑ John Deere
- ☑ Kinze
- ☑ Kuhn
- ☑ Lull
- ☑ Lundell
- ☑ Massey Ferguson
- ☑ New Holland
- ☑ Other Makes
- ☑ Steiger
- ☑ Tye
- ☑ Valley
- ☑ Valmet
- ☑ Vermeer
- ☑ Versatile
- ☑ White
- ☑ Woods
- ☑ Zetor Major Crop Check a field to include crop types.
e.g. <u>Accept loans for barley.</u>

Fig. 21E

| Major Crop | Include | Select all Crops |
| --- | --- | --- |
| | | Deselect all Crops |
| Barley | ☑ | |
| Cabbage | ☑ | |
| Canola | ☑ | |
| Carrots | ☑ | |
| Corn | ☑ | |
| Corn Silage | ☑ | |
| Cotton | ☑ | |
| Cucumbers | ☑ | |
| D.C. Soybeans | ☑ | |
| Dry Beans | ☑ | |
| Hay | ☑ | |
| Horseradish | ☑ | |
| Melons | ☑ | |
| Milo | ☑ | |
| Oats | ☑ | |
| Onions | ☑ | |
| Other | ☑ | |
| Peanuts | ☑ | |
| Peas | ☑ | |
| Popcorn | ☑ | |
| Potatoes | ☑ | |
| Pumpkins | ☑ | |

Fig. 21F

Rice
Rye
Seed Corn
Snap Beans
Sorghum
Soybeans
Sugar Beets
Sugarcane
Sunflowers
Sweet Corn
Sweet Potatoes
Tobacco
Tomatoes
Wheat - Spring
Wheat - Winter
White Corn

☑ ☑ ☑ ☑ ☑ ☑ ☑ ☑ ☑ ☑ ☑ ☑ ☑ ☑ ☑ ☑

[Save] [Close]

All loans subject to established credit qualifications. This service is not available to residents of the states of KS and NE.

Fig. 21G

| Home | My Services | About Us | FAQ | Partners | Log Out |

Lender Profile  
Product Maintenance  
View/Assign Zip Codes  
Product Criteria  
Edit Users JDC Equipment Loan Select Criteria: Credit Report Score ▽

*indicates required fields

When applicable, enter percentages as decimals (e.g. 40% = 0.4)

If you wish to disable scoring for a criteria type, please go to Criteria Weights and set the weight for that criteria to 0%.

☐ Inverted Scoring

| Score | | |
|---|---|---|
| 5 | * 750 | Or Greater |
| 4 | * 725 | 749.99 |
| 3 | * 700 | 724.99 |
| 2 | * 675 | 699.99 |
| 1 | * 650 | 674.99 |
| 0 | * | Or Lower |

[ Save ]  [ Close ]  [ Cancel ]

All loans subject to established credit qualifications. This service is not available to residents of the states of KS and NE.

Fig. 22

| Home | My Services | About Us | FAQ | Partners | Log Out |

Lender Profile
Product Maintenance   Criteria Weights - JDC Equipment Loan
View/Assign Zip Codes
Product Criteria      Criteria Type
Edit Users            *indicates required fields    Sum of all values must equal 100%

Credit Report Score          [0] %
% Loan To Value              [0] %
Years in Farming             [0] %
Debt / Equity                [0] %
Gross Farm Income            [0] %
Years at Current Address     [0] %
Net Worth                    [0] %
Loan Request/Net Worth       [0] %
Income                       [0] %
Total Assets                 [0] %

[Submit] [Cancel] [Calc Totals]  Total  [0] %

*Auto Offer Score (0-5):  [ ]
*Review Score (0-5):      [ ]

All loans subject to established credit qualifications. This service is
not available to residents of the states of KS and NE.

Fig. 23

| Home | My Services | About Us | FAQ | Partners | Log Out |

Adding Additional Term for "JDC Equipment Loan" Credit Product

Lender Profile
Product Maintenance
View/Assign Zip Codes
Product Criteria
Edit Users

*indicates required fields.

Label *

Description
(200 Characters) *

Save   Close

All loans subject to established credit qualifications. This service is not available to residents of the states of KS and NE.

INTEGRATED FINANCIAL PROCESSING SYSTEM AND METHOD FOR FACILITATING AN INCENTIVE PROGRAM

This document claims priority based on U.S. Provisional Application 60/439,572, filed Jan. 10, 2003, and entitled INTEGRATED FINANCIAL PROCESSING SYSTEM AND METHOD FOR FACILITATING AN INCENTIVE PROGRAM, under 35 U.S.C. 119 (e).

FIELD OF THE INVENTION

The invention relates to an integrated financial processing system and method for facilitating an incentive program via electronic communications.

BACKGROUND OF THE INVENTION

As used herein, an agricultural input product includes, but is not limited to, any good, equipment, machinery, infrastructure, computer hardware, software, location-determining receiver, supplies, seed, fertilizer, herbicide, insecticide, fungicide, pesticide, feed, medicine, and any other items that are used by producers to perform agriculture-related work. A producer means any grower of crops or plant-life, any producer of livestock or both. Sellers of agricultural products may provide incentive programs (e.g., purchasing programs) to market their agricultural products to the producers.

An incentive program may require a producer to conduct a transaction related to one or more agricultural input products under specific terms and conditions. The incentive program may induce the producer to participate in the program by providing fiscal or economic incentive to enter into the transaction. The terms and conditions may be based upon the financial qualifications of the producer, land resources of the producer or other resources of the producer.

In accordance with previous business practices, the producer may select an incentive program after consultation with a retailer on the available incentive programs. For example, a retailer may provide paper brochures on various incentive programs. If a producer was interested in an incentive program, the producer would need to arrange financing on his own with a lender that was appropriate. For example, the producer may contact his local financial institution or another lender for a loan to purchase the agricultural input products associated with the incentive program. Accordingly, a producer might need to provide his financial or biographical data in a duplicative, disjointed, and time-consuming manner, first to the retailer and later to the lender.

The lender may conduct a personal interview of the producer-applicant that is expensive because of the labor costs or other factors. The personal interview may only be justified for the lender for financial transactions that exceed a minimum threshold amount. Rather than conducting a personal interview, the financial institution may gather the application from the producer by mail or other seemingly low cost alternatives. Nevertheless, even the mailed information from the producer generally entails the labor costs associated with clerical processing and some nominal investigation by financial service workers. After arranging financing, the producer may return to the retailer to engage in the incentive program.

Under the foregoing previous business practices, the loan application process was generally disjointed from the incentive program selection process and awkward for the agricultural producer. The producer may not wish to participate in the incentive program or another promotion because of the difficulty and inconvenience of procuring financing. Further, the protracted loan approval process, and attendant transaction costs of the lender and the producer, may detract from the financial performance of the lender. Thus, a need exists for an integrated approach for facilitating an incentive program or providing financing for the incentive program.

SUMMARY OF THE INVENTION

In accordance with one embodiment, a library of available incentive programs is established for an agricultural product. Input is accepted from an agricultural producer or a crop planner to facilitate tailoring the library of incentive programs to the requirements (e.g., needs, objectives, and resources) of a particular producer. The library of available incentive programs is searched based upon the accepted input to select a tailored list of candidate incentive programs from the library. Information on the tailored candidate incentive programs is made accessible to the agricultural producer. The agricultural producer may select a preferential incentive program between or among the candidate incentive programs. Further, the producer may readily seek financing via electronic communications to purchase or otherwise conduct a transaction under the preferential incentive program. If the producer applies for a financial product for financing the transaction under the preferential incentive program, the previously gathered input (e.g., background data on the particular producer) is transferred to a financial screening process to reduce duplicative reentry of data and to reduce or eliminate potential clerical errors.

BRIEF DESCRIPTION OF THE DRAWINGS

FIG. 6 through FIG. 8B are illustrative screen shots associated with a program manager.

FIG. 9A through FIG. 18 are illustrative screen shots associated with a financial screening system.

FIG. 19 through FIG. 24 are illustrative screen shots that support a financial provider's configuration of the financial product.

DESCRIPTION OF THE PREFERRED EMBODIMENT

Figure 1A:
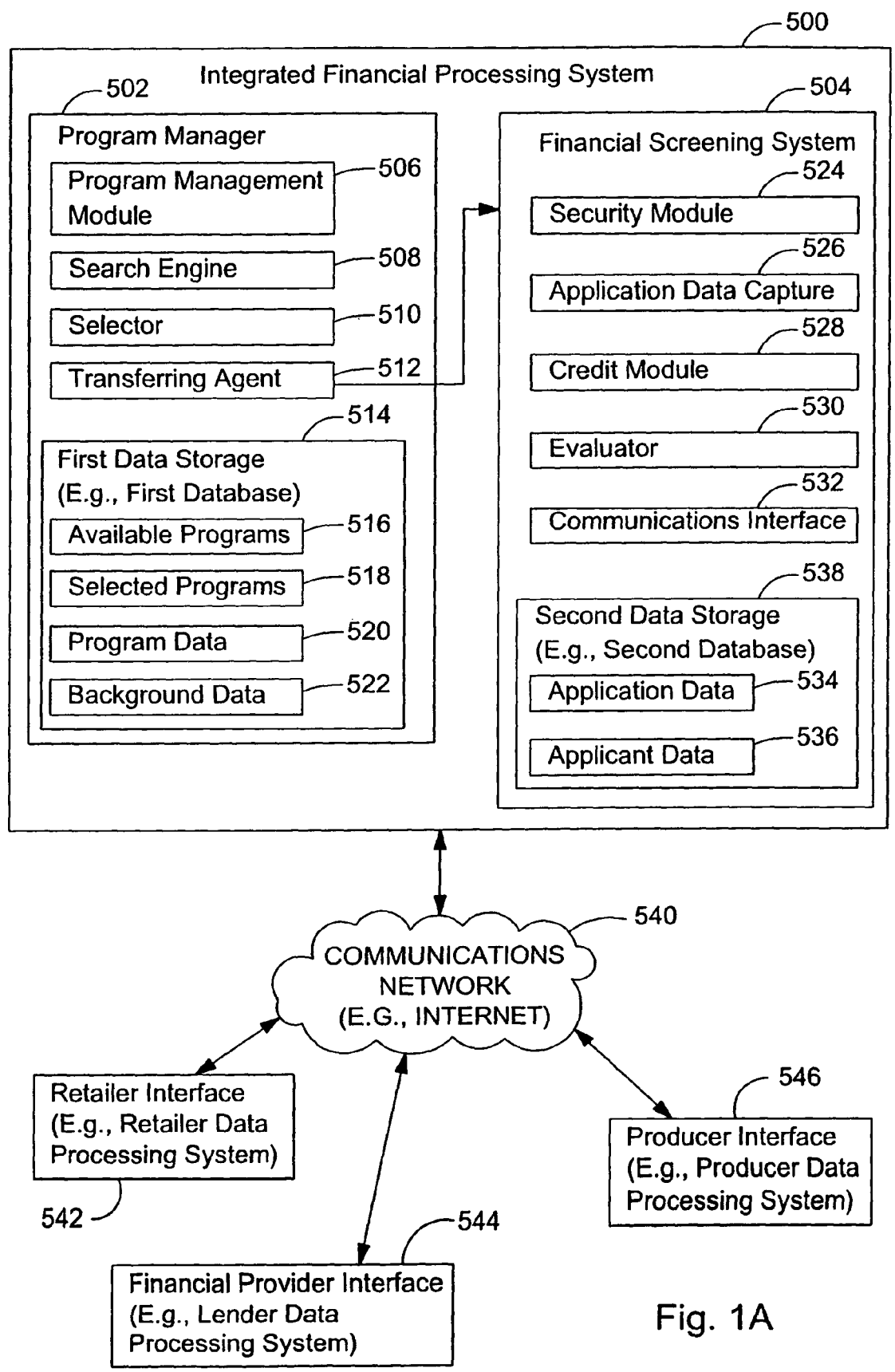
FIG. 1A through FIG. 1E are block diagrams of various embodiments of integrated financial processing systems in accordance with the invention.

In accordance with the invention, FIG. 1A illustrates an integrated financial processing system 500 that comprises a program manager 502 arranged to communicate with a financial screening system 504 (e.g., a loan processing system). The financial processing system 500 is capable of communicating with one or more of the following devices via a communications network 540 (e.g., the Internet) or another communications link: an interface, a terminal, and a data processing system. An interface may comprise a retailer interface 542, a financial provider interface 544, a producer interface 546, a terminal, a data processing system or the like. In one embodiment, the producer interface 546, the financial provider interface 544, and the retailer interface 542 may be based upon a web browser that runs on a computer. A data processing system may comprise a retailer data processing system, a financial provider data processing system or a producer data processing system (e.g., a crop planner or crop planning agent).

The program manager 502 allows a user (e.g., a producer or a retailer) to search for incentive programs, such as product offerings or offerings of agricultural inputs by or through a retailer. The incentive program may provide the producer with a discount if certain groups of agricultural input products are purchased or leased together, for example. The user may select a search criteria to facilitate retrieval of candidate incentive programs or other incentive programs that meet or substantially comply with the search criterion or search criteria. The producer's requirements may be aligned with the search criterion or the search criteria to find one or more candidate incentive programs. The user may view details or specifications of available candidate programs to support an informed decision on the pursuit or selection of an incentive program.

In one embodiment, the program manager 502 comprises a program management module 506, a search engine 508, a selector 510, and a transferring agent 512. Further, the program manager 502 comprises a first data storage 514 device that supports storage and retrieval of data for the program management module 506, the search engine 508, the selector 510, and the transferring agent 512. For example, the first data storage device 514 may store one or more of the following: available programs 516, selected programs 518, program data 520, background data 522, retailer identifiers, corresponding retailer passwords, producer identifiers, and corresponding producer passwords. In one embodiment, the first data storage device 514 of the program manager 502 comprises a first database. Program data comprises one or more of the following: a crop identifier, a chemical treatment identifier, a generic treatment identifier, a brand name treatment identifier, a fertilizer identifier, a plant hormone identifier, a herbicide identifier, a pesticide identifier, an insecticide identifier, a seed identifier, and corresponding quantities for any of the foregoing program attributes of a respective incentive program. Background data comprises one or more of the following: background producer data, demographic data, information on the producer or the producer's operations, historical information on the producer's purchase of agricultural input products, biographical data on the producer, demographic data on the producer, historical financial information on the producer, and a transactional history of the producer with respect to agricultural equipment. Background data may be provided by a producer, a retailer or another source.

The financial screening system 504 facilitates screening of an applicant for the financial provider to winnow applicants with acceptable financial risks from those with unacceptable financial risks. The financial screening system 504 supports completion of a financial application (e.g., a loan application) or a precursor thereto by the producer with minimal or no interpersonal involvement of the financial service provider. Further, the financial application or precursor thereto may be readily coordinated or integrated with the incentive program, the producer's crop plan or both.

In one embodiment, the financial screening system 504 (e.g., the loan processing system) comprises a security module 524, an application data capture module 526, a credit module 528, an evaluator 530, and a communications interface 532. Further, the financial screening system 504 comprises a second data storage 538 device for storing one or more of the following: a financial provider identifier, a corresponding financial provider password, a retailer identifier, a retailer password, a producer identifier, a producer identifier password, an application data 534, an applicant data 536, a pass/fail criterion, a pass/fail criteria, a criterion minimum value, a criterion maximum value, a scoring criteria, criteria weights, and scoring weights.

The security module 524 receives a user identifier, such as a producer identifier, and a corresponding producer password. The security module 524 verifies the authenticity of user identifier and the corresponding password to determine whether to grant access of the user (e.g., producer or retailer) to the financial screening system 504. For example, the user may access the financial screening system 504 via the communications network 540 and the retailer interface 542.

After successful authentication of the user identifier and corresponding password by the security module 524, the program manager 502 sends selected program data 520 and background data 522 from the first data storage 514 or the program manager 502 to the financial screening system 504 via the transferring agent 512. The program management data may include selected program data 520, background data 522, and other data outputted by the program manager 502.

In one embodiment, the program manager 502 or the transferring agent 512 may translate the program management data outputted from the program manager 502 to the financial screening system 504 into a suitable data message format or document format for receipt or processing by the financial screening system 504. For example, the suitable message format or document format may refer to an XML (Extensible Markup Language) message or document or an SGML (Standard Generalized Markup Language) message. XML refers to a language that may be used to facilitate the following activities: describing other software languages, storing structured data, and sharing data between different computer systems or platforms which would otherwise be unable to communicate. XML is consistent with at least some aspects of SGML and represents a defined subset of SGML. The XML message facilitates a transfer of data and eliminates the need for any duplicative, time-consuming manual entry.

The program management data is seamlessly transferred to the financial screening system 504 from the program manager 502 for the producer's convenience. The transferring agent 512 eliminates duplicative entry or inquiries of the background data 522 and other qualifications of the agricultural producer. The seamless transfer of the program management data allows the producer to apply for financing with a nominal or exiguous expenditure of time and effort.

The application data capture module 526 collects the selected program data 520, background data 522, and any other program management data for the completion of an application or screening for the financial product. The credit module 528 may request a credit bureau report from a credit bureau or from another database containing credit data (e.g., credit worthiness data) related to the applicant-producer. The credit module 528 accesses or receives the requested credit data, such as a credit bureau report, a credit report rating or a credit output derived therefrom. In one embodiment, if the credit bureau report rating for the agricultural producer exceeds a certain minimum quantitative threshold, the process continues with an evaluation by the evaluator 530. However, if the credit bureau report does not comply with the financial provider's benchmark or minimum quantitative threshold, the applicant and the application may be summarily and expeditiously rejected without wasting further resources of the financial screening system 504 or subsequent human interaction that will not lead to the transaction of a financial product.

If the evaluator 530 determines that the applicant and the application comply with the financial criteria (e.g., pass-fail criterion or criteria), the applicant may be notified via an electronic communication or another communication facilitated by the communications interface 532. However, if the evaluator 530 determines that the applicant or the application do not comply with the financial criteria, the applicant may be notified of an electronic communication or another communication. Where compliance is present, the financial provider may regard the applicant and application as successfully screened and may wish to complete other requirements prior to offering the financing or any financial product (e.g., a loan). The financial provider may extend credit for the producer's purchase of an agricultural product consistent with the selected incentive program after the financial provider has verified or researched other data related to the particular application or the applicant.

The financial screening system 504 supports screening of the applicant-producer's financial qualifications in an efficient, labor minimizing manner that reduces transaction costs for the financial provider.

In one embodiment, the retailer, producer, and financial provider may be assigned different levels of access to the resources of the integrated financial processing system 500. Each user may be assigned a unique, log-in user identifier and a corresponding password. The financial processing system 500 may perform authentication by the user identifier and respective password. The user identifier may comprise any of the following: a producer identifier, a retailer identifier, and a financial provider identifier. Each user identifier may be associated with a corresponding different level of access to the resources of integrated financial processing system 500. For example, a retailer may be associated with a retail level of access; a producer may be associated with a producer level of access; or a financial provider may be associated with a financial provider level of access where the retail level of access, the producer level of access, and the financial-provider level of access differ from one another. In addition to the user identifier and the password, the financial processing system 500 may be protected by supplemental security measures (e.g., firewalls, encrypted files, and encrypted communications) to guard against unauthorized access to sensitive information associated with the financial processing system 500.

Figure 1B:
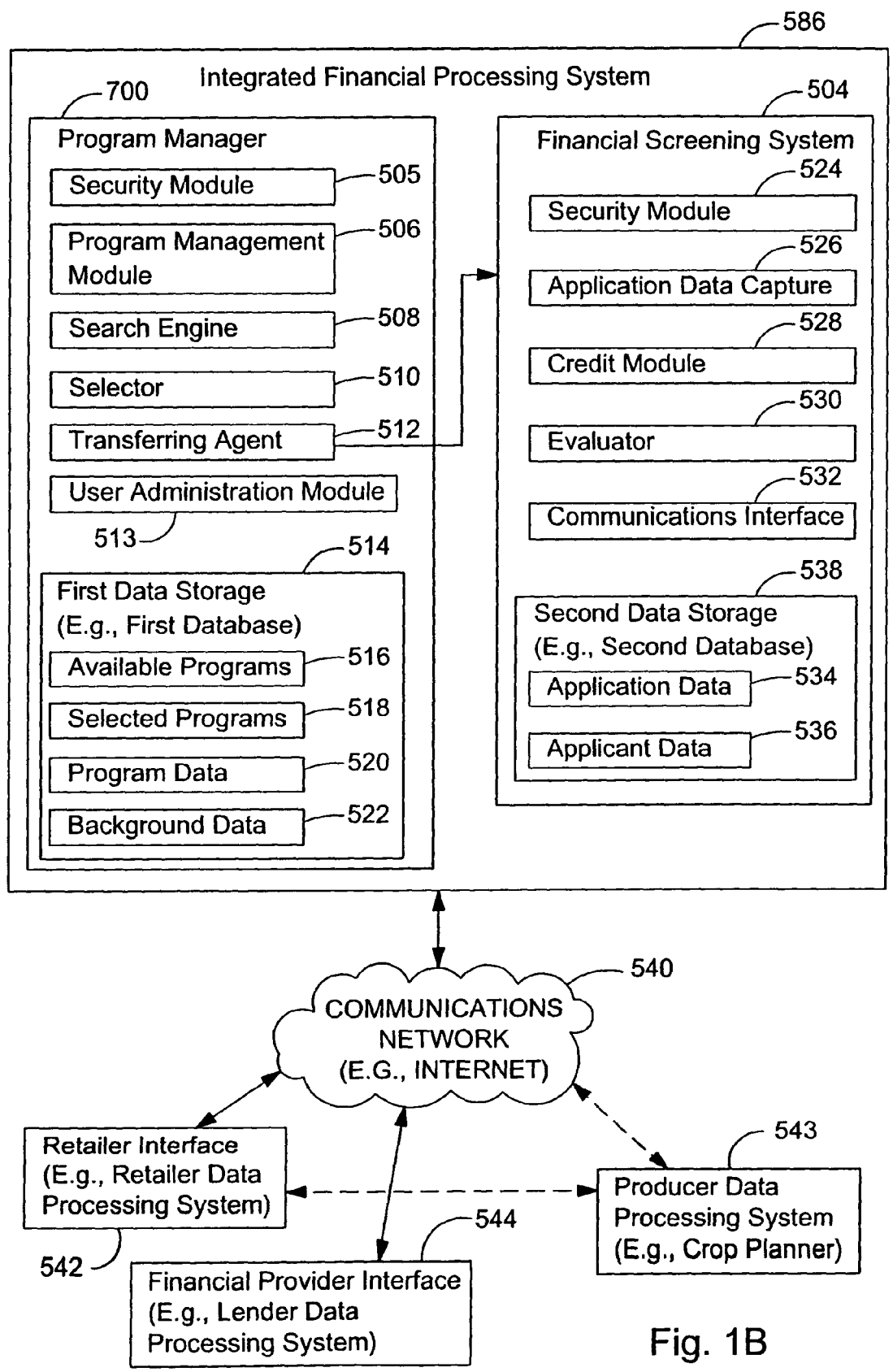

FIG. 1B illustrates a financial system that is similar to the financial system of FIG. 1A, except the producer interface 546 of FIG. 1A is replaced with a producer data processing system 543 in FIG. 1B. Further, the producer data processing system 543 may communicate with the integrated financial processing system 586 through the retailer interface 542 as an intermediary, as indicated by the dashed lines between the producer data processing system 543 and the other network elements (i.e., communications network 540 and retailer interface 542). Like reference numbers in FIG. 1A and FIG. 1B indicate like elements.

In the configuration of FIG. 1B, the retailer interface 542 may allow the producer access to the integrated financial system via the retailer interface 542 as a proxy server or via the user interface (e.g., graphical user interface) of the retailer interface 542 after authenticating the producer identifier and a corresponding producer password. One or more security modules (e.g., 505, 524) may be associated with the retailer interface 542, the program manager 700, and the financial screening system 504. Each security module (e.g., 505 or 524) is capable of authenticating the producer identifier and the corresponding password.

The retailer of FIG. 1B may control and define the access of the users to the integrated financial system 586 to meet its business objectives and preferences. A retailer may begin a financial application process for a producer.

The program manager 700 may have a user administration module 513 for administering the incentive programs and financing activities for one or more users. The administration module allows the retailer to define, revise, delete or edit any of the following: a user profile for a user of the financial processing system 586, a retailer profile, and a producer profile. The retailer profile allows a user to define retailer data such as business hours, payment method, browser, browser version, internet provider or other information that may be used by the integrated financial processing systems 586 or a service provider related thereto to provide the retailer with an enhanced level of technical or business support.

The financial screening system 504 stores a retailer profile for each retailer in the second data storage 532 or elsewhere. The retailer profile may comprise one or more of the following fields: retailer name, retailer address, retailer communication data or retailer technical information. The financial screening system 504 may provide the retailer with services based on the retailer log-in identifier, (e.g., the retailer may be provided with credit financing options). In one embodiment, upon logging onto the financial screening system 504, the retailer is presented with a menu that enables the retailer to select from one or more of the following choices: retailer profile, review of applications, producer log-in, new application, and edit users. The review applications in any selection enables the retailer to review applications and allows the retailer to review both saved and completed applications.

The review application function allows a retailer to review the status of an application. The applications may be searched by application number, social security number of the applicant-producer or phone number of the application-producer. Once the retailer enters a query about a pending application of a producer, the system will return information about the pending application, (e.g., the retailer may be presented with a chart that provides application number, loan application status, and step).

In one alternate embodiment, the retailer may have a crop planner to facilitate development of a crop plan for a grower.

In another alternate embodiment of FIG. 1B, the producer data processing system 543 may transfer data to the retailer interface 542 via a portable storage media, a magnetic disk, an optical disk or by any other data transfer technique other than via a communications link or the communications network 540.

Figure 1C:
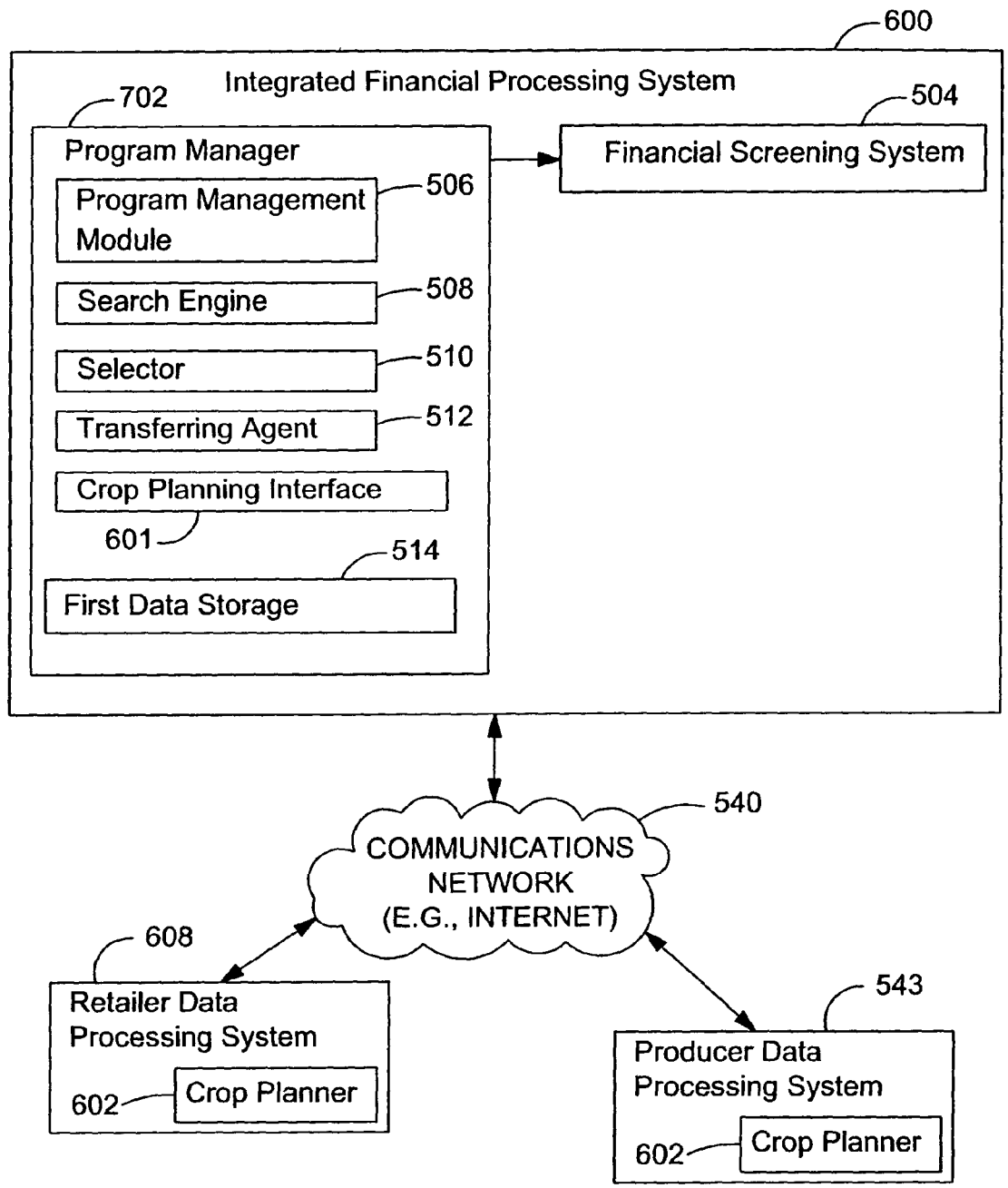

FIG. 1C illustrates a financial processing system 600 that is similar to the financial processing system 500 of FIG. 1A, except the financial processing system 600 of FIG. 1C has a crop planning interface 601 associated with the program manager 702. Like reference numbers in FIG. 1A and FIG. 1C indicate like elements.

The program manager 702 includes a crop planning interface 601 for receiving crop planning data from the crop planner 602. The crop planning interface 601 supports the transfer of crop planning data or a crop plan from a crop planner 602 or a producer data processing system 543 to the integrated financial processing system 600. The crop planner 602 may be associated with a retailer data processing system 608, a producer data processing system 543 or both. The crop planning data may include one or more of the following: a crop plan, background producer data, and demographic data. Crop planning data includes one or more of the following: a list of applicable agronomic inputs and corresponding quantities, a list of agricultural goods or products and corresponding quantities, a chemical treatment plan or regimen, a growing practices plan or regimen, a seed identifier, a seed quantity, an insecticide identifier, an insecticide quantity, a pesticide identifier, a fertilizer identifier, and a fertilizer quantity.

In one embodiment, the crop planning interface 601 provides a translator for translating the crop planning data outputted by the crop planner 602 from a brand-name or product specific format to a more generic description. The crop planning data may provide generic names of goods and agricultural inputs or it may provide brand names. In the former case, the crop planning interface 601 does not need to translate the generic names. However, in the latter case, the crop planning interface 601 may use a look-up table, a local database, or a remotely accessible database to translate brand names and priority names into generic names or generic identifiers that are more universally applicable across different program sponsors, manufacturers or providers of agricultural goods and services.

In one embodiment, a crop planner provides a search criteria or a crop planning output to the retailer interface 542, the program manager 702 or both. The crop planning program output may provide a list of products to be grown. The crop plan may be used to search the incentive programs associated with the program manager 702 such that the crop plan and the incentive programs relate to substantially the same product identifiers or interchangeable products for a particular producer. For example, if the grower or producer currently uses a generic chemical treatment for his crop, the program manager 702 may output all incentive programs that include one or more brand name chemicals equivalent to the generic chemical treatment of the crop planning program output.

In one embodiment, the crop planning interface 601 has a remainder filter for capturing agricultural goods and inputs that are not included in an incentive program, but are included in the crop planning data inputted to the program manager 702. If certain remaining goods fall outside an incentive program, but remain within a crop plan, the remaining agricultural input products may be part of a secondary incentive program or another financial transaction with one or more financial providers. For example, the financial provider may provide a commercial loan to cover the gap between the incentive program and the crop plan so the producer can purchase the requisite remaining agricultural inputs. The commercial loan, in such a situation, may not be affiliated with any incentive program.

The program manager 702 can forward all useful crop planning data, crop plan, background producer data, and demographic data to the financial screening system 504 for populating fields of an application for a financial product (e.g., a loan). The crop planning data may include one or more of the following: a crop plan, background producer data, and demographic data. The program manager 702 may use demographic data to initiate a search of available incentive programs 516, whereas the financial screening system 504 may use demographic data or background data to perform a credit bureau check by the credit module 528, for example.

Figure 1D:
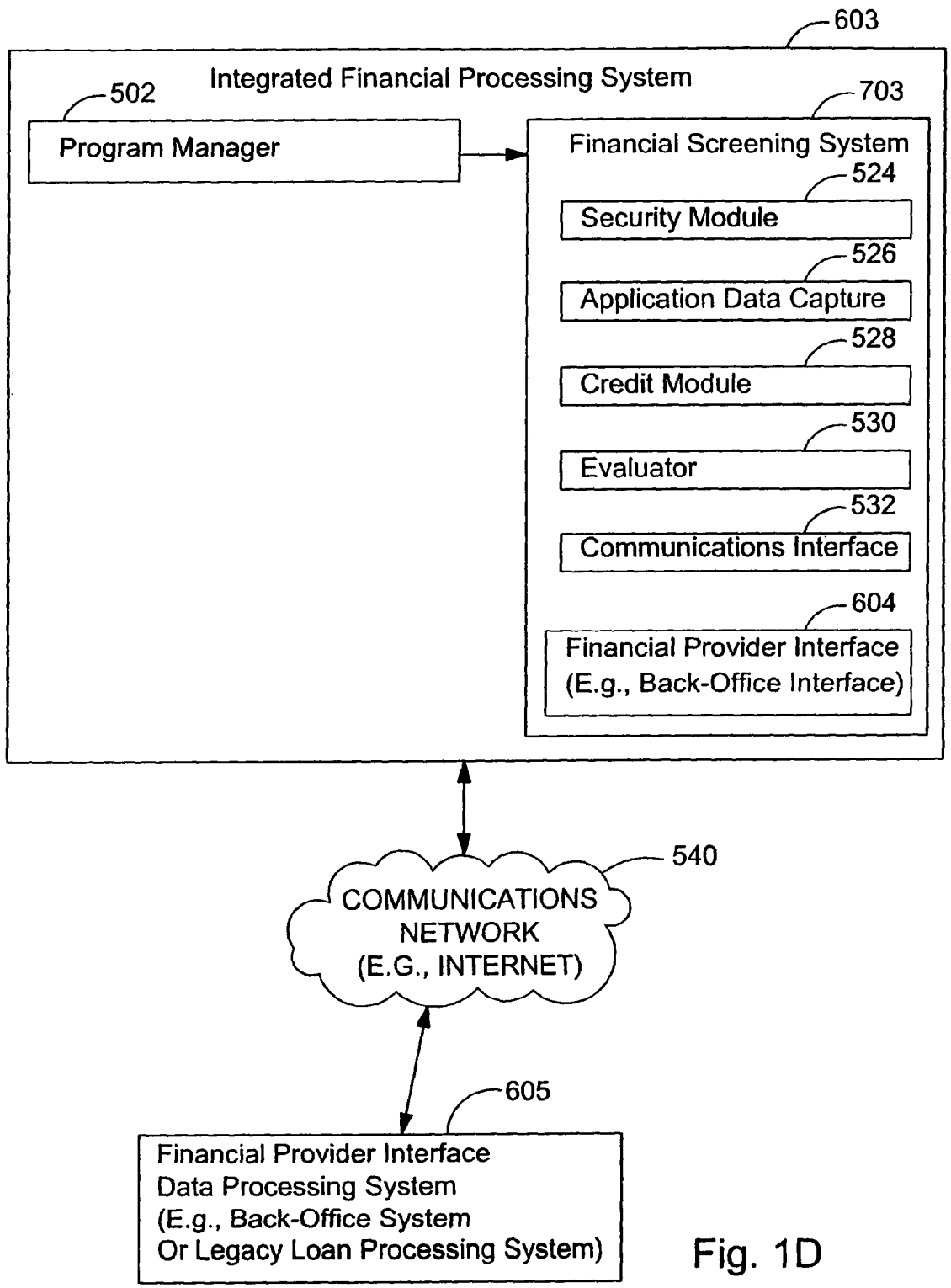

FIG. 1D illustrates a financial processing system 603 that is similar to the financial processing system 500 of FIG. 1A, except the financial processing system 603 of FIG. 1D has a financial provider interface 604. Like reference numbers in FIG. 1A and FIG. 1D indicate like elements.

The financial provider interface 604 may provide a communications interface, a data formatter, a data translator or any combination of the foregoing items that support transfer of data from the integrated financial processing system 607 to the financial provider data processing system 605, such as a back-office data processing system or a legacy lending processing system. The financial provider interface 604 of the financial screening system 703 may translate loan application data 534 or other financial data into a data format (e.g., XML message) or data structure that the data processing system 605 of the financial provider is capable of interpreting. The financial provider interface 604 facilitates economical and coordinated operation of the information resources or computer resources of the financial provider with the integrated financial processing system 607. The financial provider interface 604 may conserve resources (e.g., human or computer) of the financial provider that might otherwise be necessary to enter data into loan applications or other financial forms and to store or file such applications in an organized fashion for subsequent retrieval.

Figure 1E:
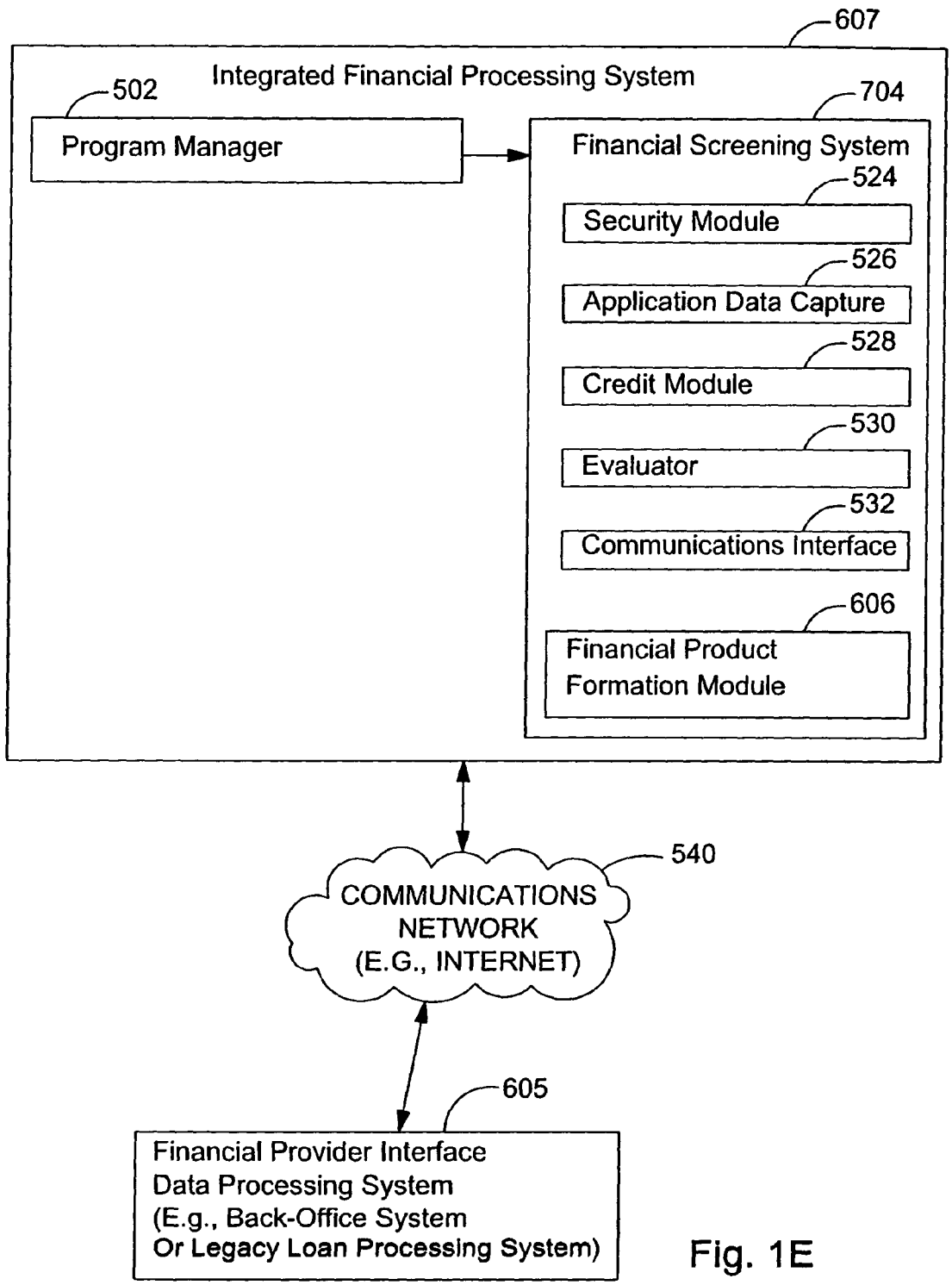

FIG. 1E illustrates a financial system that is similar to the financial system of FIG. 1A, except the financial system of FIG. 1E further includes a financial product formation module 606 in the financial screening system 704. Like reference numbers in FIG. 1A and FIG. 1E indicate like elements.

The financial screening system 704 comprises a financial product formation module 606. The financial product formation module 606 supports definition, revision, and customization of one or more financial products, including financial criteria and/or scoring requirements for the respective individual financial products. In one embodiment, the financial product formation module 606 may comprise a browser-based, menu-driven system that allows establishing of financial criteria (e.g., financial applicant criteria or financial product criteria).

The financial product formation module may be used to define or restrict the offering group (e.g., retailers, producers, and customers) or marketplace for the financial product. For example, the financial provider has the ability to select the business entities, retailers or distributors that utilize their financial products by limiting the availability of, or access to, the financial products to selected business entities, retailers or distributors. Only business entities, retailers or distributors that have been included in the marketplace are granted access to the financial products. In the case of the integrated financial processing system 607, some financial products are only eligible to be used by participants who meet specific incentive program requirements. Although FIG. 1A through FIG. 1D show multiple data storage devices (514 and 538) which may correspond to multiple databases, in an alternate embodiment, the data storage devices (514 and 538) may be replaced by a single global database for the integrated financial planning system. The program manager (502, 700 or 702), financial screening system 504, or both, may access the global database to store and retrieve data.

Figure 2:
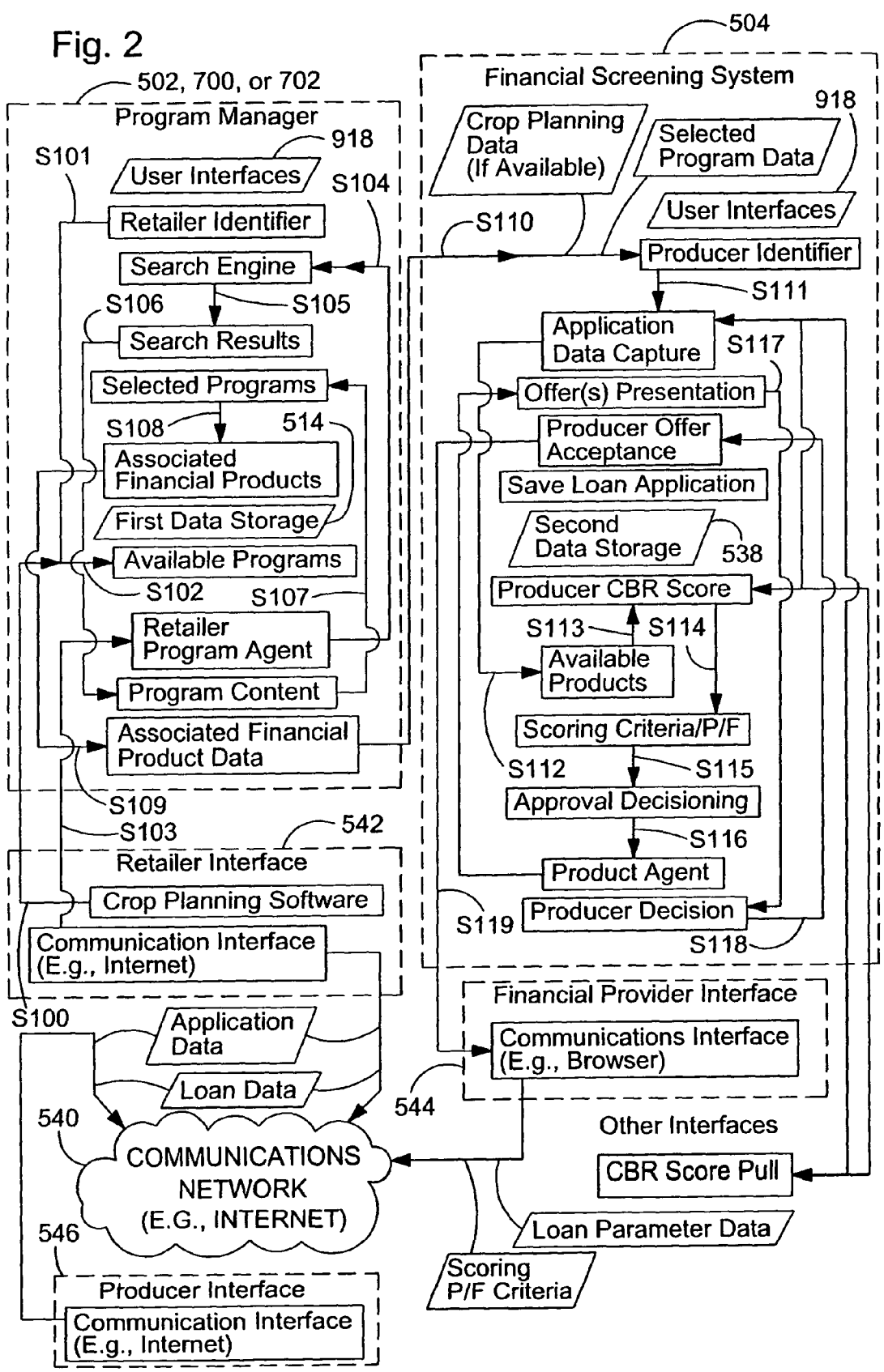
FIG. 2 is a flow diagram of an integrated financial process for facilitating an incentive program, consistent with the system of FIG. 1.

FIG. 2 provides an illustrative embodiment of one possible data structure and flow for carrying out any of the configurations of FIG. 1A through FIG. 1E.

The method of FIG. 2 begins in step S100, where a producer data processing system (e.g., a crop planner) provides crop planning data (e.g., a crop plan) for a producer for a geographic area and growing season. For example, the crop planner may provide an estimate of the quantity and type of seed required, the quantity and type of fertilizer, the quantity and type of herbicide, the quantity and type of pesticide, and other agronomic inputs required for the producer's land usage during an upcoming growing season.

In step S101, the retailer may log on to the program manager 502 by entering a retailer identifier and a corresponding password when the retailer wishes to access one or more resources of the program manager 502. For example, the retailer may access the resources on behalf of a producer to facilitate a producer conducting a transaction pursuant to an incentive program and obtaining financing for the transaction (e.g., a universal or comprehensive list).

In step S102, the retailer may select one or more incentive programs from a list (e.g., a universal or comprehensive list) of incentive programs to form a list of available programs 516. The retailer may select available incentive programs based upon any of the following factors: the types of crop grown in the geographic area which the retailer services, the preferences of growers and producers, the business relationships of the retailer with suppliers of the programs, and other factors.

In step S103, the retailer may input any of the following input data into the program manager 502: the crop planning data from the crop planner, background data 522 on the producer or the producer's operations, biographical data on the producer, demographic data on the producer, and any other input data.

In step S104, the search engine 508 may compare the input data (from step S103) to the program attributes of the available incentive programs. For example, the search engine 508 may search the available incentive programs for a match of input data (e.g., crop planning data) to program data of the incentive program. The matching input data and program data may comprise one or more of the following: matching crop identifiers, matching pesticide identifiers, matching fertilizer identifiers, matching herbicide identifiers, and other matching information.

In step S105, the search engine 508 outputs the list of search results or candidate incentive programs, which represents a subset of the available programs 516. For example, the output of the search engine 508 may represent one or more candidate incentive programs where a match is present between the program data (e.g., program attributes of the incentive program) and the crop planning data (e.g., characteristics of the crop plan). The matching crop planning data and the program data may comprise one or more of the following: matching crop identifiers, matching pesticide identifiers, matching herbicide identifiers, and other matching information.

In step S106, the retailer, the producer, or both, may review the program content associated with the outputted list of search results. For example, the producer may review an electronic brochure that describes details of the candidate incentive programs.

In step S107, after reviewing the program content of one or more candidate programs, the retailer, the producer or both may select a preferential program from the output of the search engine 508. A set of financial products may be associated with the preferential incentive program selected.

In step S108, the selected preferential incentive program triggers or supports the completion of an application for at least one financial product associated with the preferential incentive program. Each incentive program may be associated with one or more corresponding financial products or services. For example, the incentive programs and corresponding financial products and services may be stored in a look-up table or another reference database.

In step S110, the associated financial product or service data, background data 522, selected program data 520, and crop planning data is transferred from the program manager 502 to the financial screening system 504. The associated financial product data may be used to support completion of an application under the direction of the financial screening system.

In step S111, the producer enters, or is prompted to enter, a producer identifier. Upon entry of the correct producer identifier and corresponding password, the producer is granted access to the financial screening system 504.

In step S112, an application data capture module 526 captures input data from one or more of the following: program management data, transferred financial product data, transferred background data 522, transferred program data 520, and transferred crop planning data transferred from the program manager 502. Program management data includes, but is not limited to financial product data, background data, program data, and crop planning data. In one embodiment, additional information may be inputted from a user interface to complete data entries required for an application. Additional information is not available from the program management data.

In step S113, the application data 534 may determine the available financial products that correspond to the program management data, including the transferred background data 522 and selected program data 520.

In step S114, the applicant information or background data is used to obtain credit data (e.g., a credit bureau report) on the applicant. If the applicant passes the credit check of the credit data, the process of FIG. 2 continues. For example, if the applicant has a satisfactory credit bureau report, the process of FIG. 2 continues. Otherwise, if the applicant fails the credit check, the process of FIG. 2 ends and the user may be notified with an appropriate message (e.g., message of unsatisfactory credit). The applicant may fail the credit check where the applicant has an unsatisfactory or deficient credit bureau report, for instance.

In step S115, if the credit check of the credit data is satisfactory, the application data 534 is forwarded to the evaluator 530 for evaluation consistent with the financial criteria (e.g., pass/fail criteria scoring) of an application relative to the benchmark level or levels of the financial criteria. The financial criteria refers to any measure previously established or approved by a financial provider to evaluate the credit risk or other financial risk to the financial provider in providing financing for a financial product associated with the application. If the application complies with the pass/fail scoring criteria, the method continues with step S115 in which the evaluator 530 decides whether to approve the application based on any other financial requirements. Additional financial requirements may include supplemental information or further financial criteria. For example, the financial provider may search its historical loan data to check on a financial history of the applicant.

In step S116, a product agent gathers the specification of the financial product or financial products that appears to meet the financial objectives of the approved applicant of the approved application.

In step S117, the screening process presents an offer to the applicant (e.g., the producer) for the approved financial product or financial products.

In step S118, the applicant-producer decides whether to proceed with the presented offer. If the applicant-producer rejects the offer, the process of FIG. 2 may end. However, if the applicant producer accepts the offer or elects to proceed, the process of FIG. 2 may continue by notifying the applicant-producer that a financial provider associated with the selected financial product of interest will contact the applicant to further evaluate the proposed financial transaction or to complete the financial transaction.

In step S119, the screening system may forward the application data 534 to the financial provider via the communications network 540 or otherwise. For example, the screening system may transmit the application data 534 to the data processing system (e.g., back-office system) of the financial provider for processing or for access by human representatives of the financial provider for later communications with the applicant-producer. Throughout the method of FIG. 2, the user interfaces 918 support communications, display and interaction of the user with the program manager (e.g., 502, 700 or 702), and the financial screening system 504.

Figure 3A:
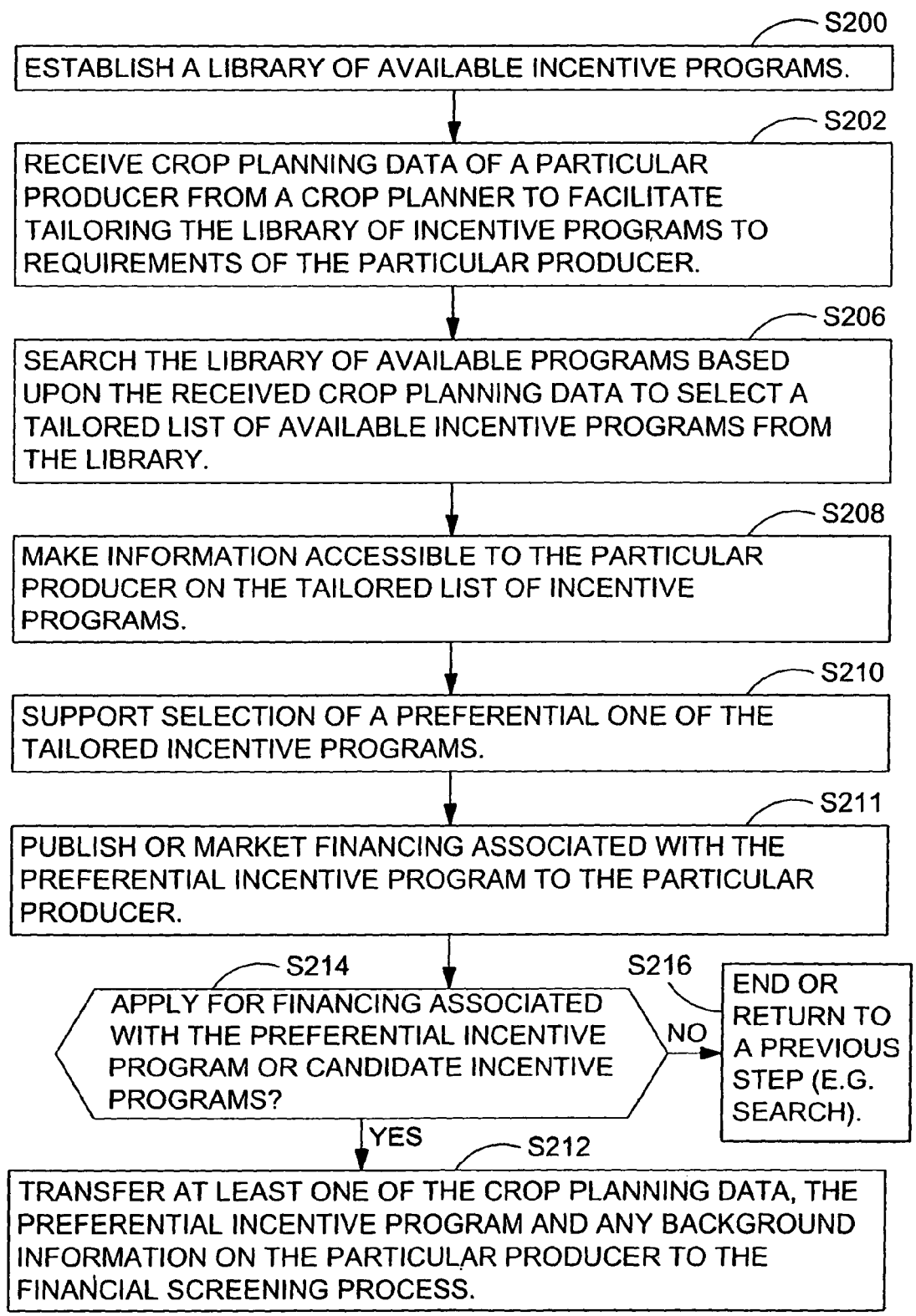
FIG. 3A is one example of a method for facilitating the incentive program in a preparatory phase.

FIG. 3A is a method for financial processing of data to facilitate application to an incentive program for a producer. The method of FIG. 3A starts in step S200.

in step S200, the program management module 506 or the program manager 502 establishes a library of available incentive programs. An incentive program is designed to provide an economic incentive or stimulus for the producer (e.g., a producer-purchaser) to purchase, lease or transact in goods or agricultural input products supplied by or through the retailer. An incentive program may comprise one or more of the following: a financing program, an equipment financing program, a promotional program, a sales discount program, a rebate program, a purchasing program, and a leasing program. An incentive program may be contingent upon the purchase of a minimum monetary amount or minimum quantity of one or more goods or agricultural input products by the producer, for example.

The program management module 506 allows the retailer to customize or tailor the list of available programs 516 based on retailer preferences. The retailer preferences on the available incentive programs may consider marketing studies, demographics, brand recognition, historic sales, new product introduction, distribution agreements, and existing supplier relationships among other factors. The retailer may limit the incentive programs to certain providers with superior quality or customer satisfactions or for any other reason that promotes product sales under the incentive programs or otherwise.

A retailer can select which incentive programs will be available to the customers (e.g., producers). A retailer can make all or a comprehensive assortment of the incentive programs available to the customers. Alternately, the retailer can determine or limit the available incentive programs based upon the geographic region that the retailer serves, program sponsors (e.g., manufacturers) with which the retailer has existing agreements (e.g., franchise or distribution agreements) or other factors.

Accordingly, the integrated financial processing system 500 can be used to select available incentive programs to facilitate contractual compliance between the retailer and the program sponsor (e.g., manufacturer or supplier) of products underlying the incentive programs.

In step S202, the program management module 506 or the program manager 502 receives crop planning data of a particular producer from a crop planner to facilitate tailoring the library of incentive programs to requirements (e.g., financial requirements, objectives, and needs) of a particular producer. The crop planner may produce a crop plan or crop planning data that includes producer data, one or more product identifiers, quantity identifiers corresponding to the product identifiers that a producer requires. The producer data may include an acreage of a producer, the geographic location of a producer's land, the geographic area of the producer's land, historic crops grown or other information. In one embodiment, the crop plan may be arranged in a data structure (e.g., XML format) that is suitable for transfer to, and interpretation by, the program manager 502.

In one embodiment, components of the crop plan or crop planning data are used as search terms for comparison to a database of available programs 516. If a component of a crop plan or extracted search term matches a program attribute of a particular program, the program is identified or displayed for a user as a candidate program. A component of crop plan may include a scientific name or a brand name for an agricultural input or a chemical or compound with agricultural use, for example. Similarly, the program attribute may contain the same scientific name or brand name for the chemical or compound.

In step S206, the search engine 508 or program manager 502 searches the library of available programs 516 based upon the received crop planning data and the gathered background data 522 to select a tailored list of available incentive programs from the library. The program manager 502 may direct a user, a producer or a retailer to a search criteria screen. The search criteria screen provides a searching tool to find incentive programs available to customers (e.g., producers) of the retailer. The retailer can define the search criteria to limit the results of the search by one or more of the following items: program type, season, state, program sponsor, product, crop, and any other germane information.

In one configuration, the search algorithm may be arranged such that the program manager 502 returns a list of candidate incentive programs. Candidate incentive programs may include applicable incentive programs and potentially relevant incentive programs. Potentially relevant programs are programs that would be applicable, but for a submitted crop plan or query that fails to satisfy the minimum purchase or minimum transaction requirement. Accordingly, because the producer is aware of potentially relevant and applicable programs, the producer may increase the purchase amount or transaction amount if he is aware of the incentive program.

In step S208, the program manager 502 provides the particular producer with access to the candidate incentive programs. For example, the search engine 508 or program manager 502 provides access to information on the tailored candidate incentive programs to an agricultural producer via a retailer. In one embodiment, the program manager 502 may display an electronic brochure for a corresponding incentive program. In an electronic brochure, one or more incentive programs may have a minimum purchase requirement for one or more products. The user may review the candidate programs and select a selected or preferential program for the candidate programs based on the producer's preferences.

In step S210, the selector 510 or the program manager 502 supports selection of a preferential one of the tailored incentive programs.

In step S211, the program manager 502 publishes or markets financing information associated with the preferential incentive program with the particular producer. For example, the program manager 502 may present or transmit financing information to the producer via the communications network 540 on one or more financial products associated with a preferential incentive program. In one embodiment, the producer may view the presented preferential incentive program or details on the preferential incentive program via the retailer interface 542 or the producer interface 546.

In step S214 via the retailer interface 542 or the producer interface 546, the producer decides whether or not to apply for one of the financial products presented by the program manager 502. For example, the producer may apply for a financial product associated with the preferential incentive program or one of the candidate incentive programs. If the producer applies for financing pursuant to one of the presented financial products, then the method of FIG. 3A continues with step S212. However, if the producer does not apply for any financial product or financing, the method of FIG. 3A continues or ends with step S216.

In step S212, the program manager 502 transfers at least one of the crop planning data, the preferential incentive program, and any background information on the particular producer to the financial screening process. Sales of goods or agricultural input products under the incentive program may be promoted by the improved convenience and accessibility to financing (e.g., credit for the producer-purchaser) that the financial screening system 504 (e.g., credit engine) provides.

In step S216, the method may end or return to any previous step of the method of FIG. 3A. For instance, the method may return to step S208 to allow a producer to select a different preferential incentive program in step S210. The steps that would ordinarily follow step S208 may be executed another time in the order that they appear in FIG. 3A.

Figure 3B:
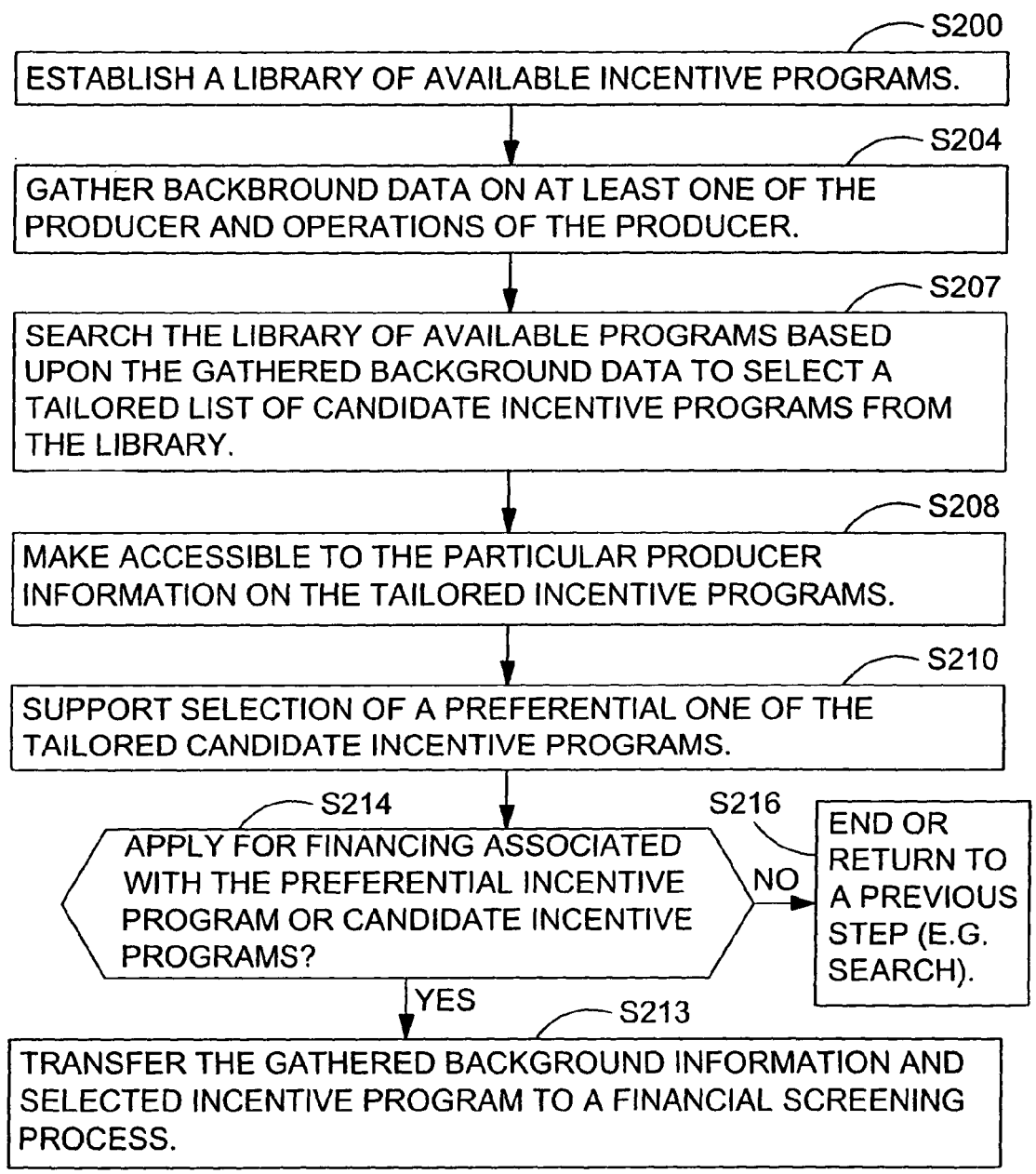
FIG. 3B is another example of a method for facilitating the incentive program in a preparatory phase.

FIG. 3B is a flow chart of a method for managing an incentive program. Like references numbers in FIG. 3A and FIG. 3B indicate like elements. The method of FIG. 3B is similar to the method of FIG. 3A, except for new steps S204, step S207, and step S213, which are integrated with some of the previously-described steps of FIG. 3A.

In step S204, the program manager 502 or the program management module 506 gathers background data 522 on at least one of the producer and the operations of the producer. The background data may include, but need not include, producer data. Producer data comprises one or more of the following items: producer name, producer address, business entity type, a tax identifier, a social security number, tax identification number, and any other demographic information. The producer data may be used to support alignment of the producer identifier with at least one corresponding available incentive program. Further, the producer data may be used to populate one or more applicable applications (e.g., loan applications). In one embodiment, producer data includes a producer name, producer address, and social security, tax identifier numbers or other demographic information.

In step S207, a library of available programs is searched based upon the gathered background data to select a tailored list of candidate incentive programs from the library.

In step S208, information on the candidate incentive programs is made accessible to the particular producer.

In step S210, the selector 510 supports selection of a preferential one of the candidate incentive programs.

In step S214 via the retailer interface 542 or the producer interface 546, the producer decides whether or not to apply for one of the financial products presented by the program manager 502. For example, the producer may apply for a financial product associated with the preferential incentive program or one of the candidate incentive programs. If the producer applies for financing pursuant to one of the presented financial products, then the method of FIG. 3B continues with step S213. However, if the producer does not apply for any financial product or financing, the method of FIG. 3B continues or ends with step S216.

In step S213, the transferring agent 512 transfers the gathered background information and the selected preferential incentive program to a financial screening process. For example, if the producer meets certain threshold requirements or a sufficient data entry profile for the incentive program, the producer may indicate interest in completing a financial application (e.g., a loan application). To seek financing for the incentive program, the user may access or apply for financing (e.g., a loan or credit product) through a cooperative hand-off between the program manager 502 and the financial screening system 504. The producer may be provided with an application button on a user interface of a producer interface 546 or otherwise to begin the financial screening process. In one embodiment, by activating the application button, the producer applies for a specific financial product (e.g., a loan or credit product) associated with a respective incentive program (e.g., from among the candidate programs or the selected preferential program). The user completes the application process for financing through interaction with the financial screening system 504 as will be later described.

In step S216, the method may end or return to any previous step of the method of FIG. 3B. For instance, the method may return to step S207 to allow a producer to execute another search of the library of available programs, using a different search query. The steps that would ordinarily follow step S207 may be executed another time in the order that they appear in FIG. 3B.

Figure 4A:
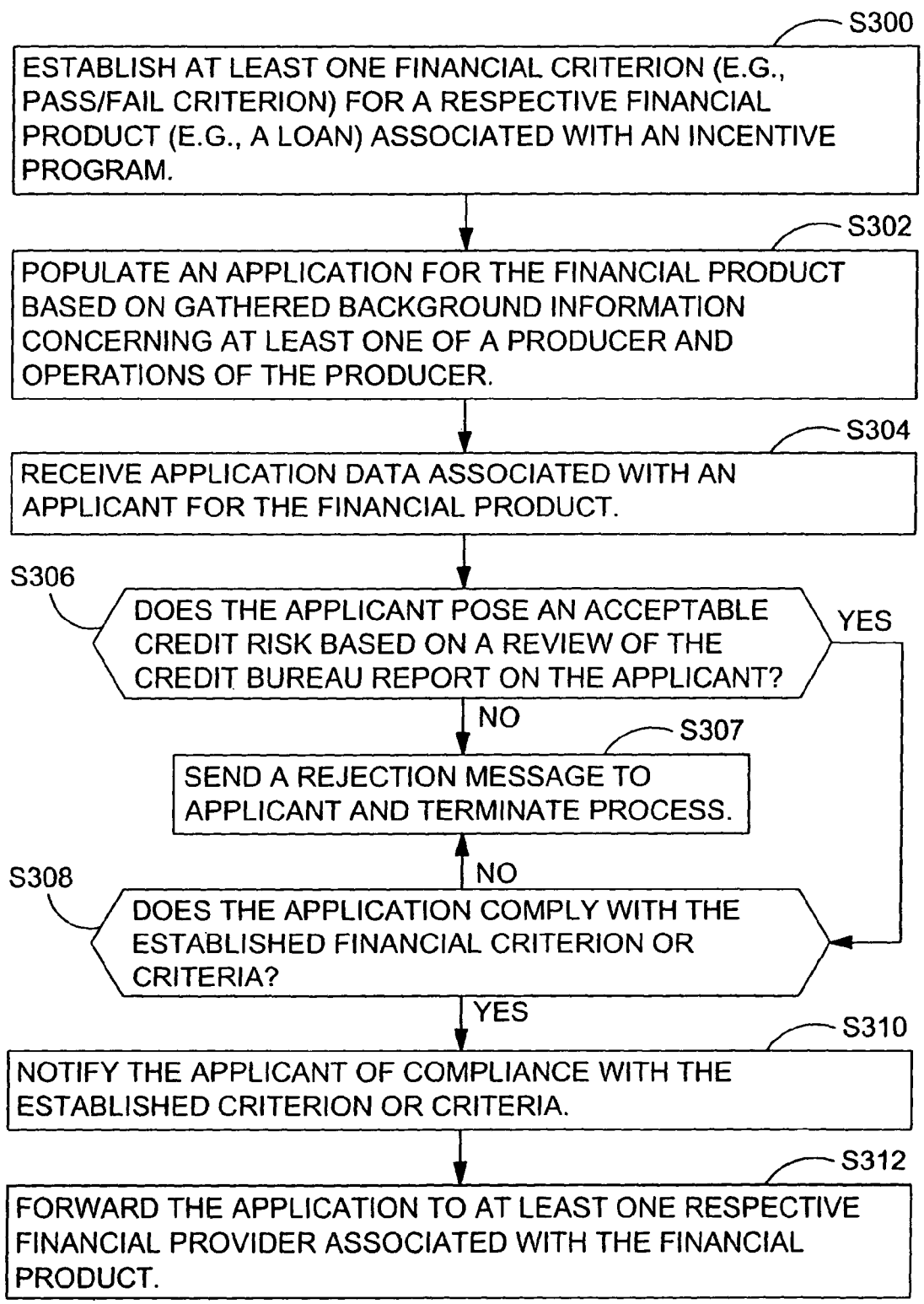
FIG. 4A is one example of a method for facilitating the incentive program in a subsequent phase following the preparatory phase of FIG. 3A or FIG. 3B.

The method of FIG. 4A relates to a screening process for screening the creditworthiness of an applicant for a financial product associated with, or in support of, the selected incentive program (e.g., selected pursuant to FIG. 3A or FIG. 3B). The method of FIG. 4A starts in step S300.

In step S300, an evaluator 530 establishes at least one financial criterion (e.g., applicant criterion, application criterion, product criterion, and incentive program criterion) for a respective financial product (e.g., a loan) associated with a selected incentive program. The financial product may comprise a loan, a secured loan, an unsecured loan, a collateralized loan, purchasing financing, equipment financing, a revolving credit contract, a leasing arrangement or another financial offering. Each financial product has one or more requisite financial criteria that the applicant must satisfy as a precondition to the financial product's availability for the applicant. The requisite financial criteria of the financial product may include one or more of the following parameters: a transaction amount, a maximum transaction amount, a minimum transaction amount, a term, a maximum term, a minimum term, an interest rate, a maximum interest rate, a minimum interest rate, an adjustable interest rate, an interest rate index, a minimum loan amount, a maximum loan amount, an interest rate range, a term range, acceptable equipment types, a secured lender requirement, a security interest in real estate or equipment, a purpose restriction, and any another applicable financial attribute financial product.

One or more of the following financial criteria are associated with a corresponding applicant: pass/fail financial criteria, acceptable crop types, unacceptable crop types, tillable acreage, producer financial history, producer income history, producer loan history information, producer prior bankruptcy information, a U.S. citizenship of producer, the geographic area of producer's land, and geographic location(s) of producer's land. If multiple financial providers participate in the offering of financing products, each financial provider may have multiple financial products which may be associated with one or more incentive programs. Further, each financial provider may independently set and control its financial products and the financial criteria associated therewith.

The financial provider can add additional financial criteria (e.g., terms) to a financial product, revise terms, edit terms or delete terms in a prodigious assortment of ways. Under a first example, the financial provider can restrict or limit loan products to certain geographic areas or zip codes, for example. Under a second example, the financial provider can exclude loan proceeds from being used to purchase used equipment or for exported or non-U.S. use of the equipment. Under a third example, the financial provider may allow or prohibit certain makes, brands, models, and/or types of equipment to be financed.

In step S302, an application data capture module 526 populates an application for the financial product based on gathered background information concerning at least one of an agricultural producer and operations of the agricultural producer. At the start of the financial screening process, background data 522 (e.g., demographic data) on the producer-applicant is transferred from the program manager 502 to the financial screening system 504. The background data 522 incorporated into the financial application may include a producer identifier and a financial product identifier.

The minimum finance amount for the financing may be known based upon an incentive program requirement. In one embodiment, the requested monetary amount of the financing is the greater of the minimum for the incentive program and a minimum amount needed by the applicant. If crop planning data was used to derive a search for finding suitable incentive programs, then the minimum financing needed to support the crop plan is compared to the minimum amount for receipt of the financial product, and the greater of the two minimum may be entered or pre-populated on the financial application.

The financial provider may provide a custom application to the producer where the application is tailored to a particular financial product. The software may recognize data patterns of entered data and provide dynamic screen response for further inputs that are consistent with the previous inputs to enhance the user experience and expedite the lending and purchase of goods for the particular financial product. For example, different screens may be presented for financing of equipment under an incentive program than for purchase of seed and chemical treatments under an incentive program.

In step S304, the application data capture module 526 receives application data 534 associated with an applicant for the financial product. The financial provider can decide what other additional information the financial provider (e.g., lender) needs to complete the screening for financing associated with the financial product for the applicant. For example, additional information may include, but is not limited to, a bank reference, a spouse's name, and a serial number of equipment to be financed. A financial provider can define detailed requirements for different financial products. The financial provider can self-administer, revise, and edit the financial products and their specifications. The financial provider may require entry of data from current or past income tax returns, financial statements, and other detailed information.

In step S306, the credit module 528 executes a credit check to determine if the applicant poses an acceptable credit risk based on review of credit data (e.g., a credit bureau report). The credit module 528 may pull a credit report or rating from one or more credit rating agencies. The credit report or rating is one factor that may be used to determine whether or not to grant credit to the applicant; the credit report may be a determinative factor in denying credit in some situations. If the applicant poses an acceptable credit risk, the method of FIG. 4A continues in step S308. However, if the applicant does not pose an acceptable credit risk, the method of FIG. 4A continues in step S307.

In step S307, a rejection message is sent to applicant via electronic communications or otherwise; the process of FIG. 4A is terminated. The application is stored or archived (e.g., in a second data storage or second database) for later reference, even if the applicant's application is declined by one or more financial providers.

In step S308, the evaluator 530 determines whether the application complies with the established financial criteria (e.g., pass/fail criteria). Financial criteria refers to any benchmark that may be useful in deciding whether or not a financial provider should extend financing to a producer or another applicant. Financial criteria include, but are not limited to, the following: (1) pass/fail criteria, (2) scoring criteria, and (3) scoring criteria associated with weightings. A pass/fail criteria is a condition or attribute of an applicant or associated with an application, where the pass/fail criteria is mandatory or critical for approval of an application for financing. A scoring criterion represents a rank, score or numerical value of an attribute of a particular application of an applicant. A weight may be assigned to each corresponding scoring criterion, where the weight indicates the relative importance of a particular scoring criterion compared with one or more other scoring criteria. The pass/fail criteria, the scoring criteria, and the weightings may be used individually or collectively for an evaluation of an application.

There may be several types of pass/fail criteria: a minimum pass/fail threshold, maximum pass/fail threshold, an included pass/fail criterion, and an excluded pass/fail criterion. If a particular pass/fail value of a particular attribute of an applicant is greater than or equal to a minimum pass/fail threshold, the particular pass/fail value may be considered compliant. However, if the particular pass/fail value of the particular attribute of the application is less than the minimum pass/fail threshold, the particular pass/fail value may be considered non-compliant. If a certain pass/fail value of a certain attribute of an applicant is less than or equal to a maximum pass/fail threshold, the certain pass/fail threshold may be considered compliant. However, if a certain pass/fail value of the certain attribute of the applicant is greater than the maximum pass/fail threshold, the certain pass-fail value may be considered non-compliant. An included pass/fail criterion refers to a pass/fail criterion that is selected by a financial provider from a comprehensive list of pass/fail criteria for inclusion in the evaluation of a particular financial product. An excluded pass/fail criterion refers to a pass/fail criterion that is selected by a financial provider from a comprehensive list of pass/fail criteria for exclusion from the evaluation of a particular financial product.

A particular pass/fail value of an attribute of an application must be greater than or equal to the minimum pass/fail criteria to be considered compliant.

The evaluation of step S308 may be carried out in accordance with one or more of the following techniques, which may be used cumulatively or in the alternative. Under a first technique, an evaluation procedure or a scoring process may be set up such that if the applicant fails at least one pass/fail criteria, the application fails to gain approval for forwarding to the financial provider (e.g., the lender) for processing or evaluation.

Under a second technique, a financial provider may establish scoring criteria for the applicant's numerical financial data. The scoring criteria may consider the applicant numerical financial criteria, such as a credit bureau rating of applicant, a debt/equity ratio of the applicant, and a temporal duration (e.g., number of years in farming) practicing in a relevant agricultural business by applicant. The credit bureau search may be performed based on the background or demographic data for the producer, as will be subsequently described herein.

Under a third technique, a financial provider may evaluate an application based upon pass/fail criteria and scoring criteria. If the applicant satisfies the pass/fail criteria as a preliminary threshold matter, the application may be later evaluated in terms of scoring criteria as a secondary matter. In one embodiment, the scoring criteria may assign a score or rank to a particular attribute associated with an applicant or application. For example, the scoring criteria may assign a numerical rank within a range from zero to five for a particular attribute of an applicant or application, where zero represents the worst (e.g., lowest) numerical rank and five represents the best (e.g., highest) numerical rank. Multiple scoring criteria and their corresponding ranks may be determined for a particular application to determine an aggregate score for the application. If the aggregate score exceeds a certain level established by the financial provider, the financial provider may decide to provide financing for the applicant associated with the application.

Under a fourth technique, a financial provider may evaluate an application based upon pass/fail criteria and weighted scoring criteria. If the applicant satisfies the pass/fail criteria as a preliminary threshold matter, the application may be later evaluated in terms of weighted scoring criteria as a secondary matter. The fourth technique differs from the third technique in that the third technique represents the case where the scoring criteria have substantially equal weights. Here, in accordance with the fourth technique, each scoring criterion may be associated with a different percentage weight, wherein the total percentage weight is one-hundred percent across all scoring criteria of an application. Multiple weighted scoring criteria and their corresponding weighted ranks may be determined for a particular application to determine an aggregate score for an application. If the aggregate score exceeds a certain level established by the financial provider, the financial provider may decide to provide financing for the applicant associated with the application.

Under a fifth technique, the evaluation or scoring may assign a rank (e.g., a numerical rank to an applicant) on a scale to an applicant for one or more financial criteria. The rank may be derived from statistical samples, empirical studies, comparison to previous or historic applications or comparison to other applications. Under one conventional example, the lower the number, the higher the rank is. If the applicant meets or has a higher rank than a lower threshold rank for each and every corresponding financial criteria for a financial product, the application may be regarded as compliant. However, if the applicant has a lower rank than a lower threshold rank for at least one corresponding financial criteria for a financial product, the application may be regarded as non-compliant or deficient.

Under a sixth technique, the applicant might be assigned an aggregate or overall rank for multiple attributes, such that no one attribute is determinate and each individual attribute may be weighted differently or the same as others, based on a preference of the financial provider.

Under a seventh technique, each financial criteria may have a minimum value, a maximum value or an acceptable range of values. For example, the financial criteria may comprise a debt/equity ratio, with a minimum acceptable value greater than 3. If the minimum acceptable value of debt to equity ratio is less than 3 for a particular applicant, that applicant's application might be rejected, for example.

Under an eighth technique, the financial screening system 504 assigns a veracity weight to the applicant's input information based upon the source of the input information. The veracity weight may represent a specific example of the assignment of weightings to corresponding attributes of an applicant or application. For example, input information supplied directly by an applicant may be assigned a lesser veracity weight than input information from a third party source, such as a credit bureau or another intermediary. The evaluation may be done in accordance with a ranking, a minimum value analysis, a maximum value analysis, or otherwise, after the veracity weighting is applied.

In step S310, the communications interface 532 notifies the applicant of compliance or noncompliance with the established criteria. If the application is compliant, the electronic message may represent an offer to the applicant to continue applying for financing or to take the next step toward completion of financing under a specific financial product. However, if the application is rejected, the applicant may receive an electronic message, such as an adverse action letter or another electronic notification to the applicant. By using the integrated financial processing system 500 or the financial screening system 504, the financial provider may reduce the burden, personnel resources, and cost of screening applicants for financial products (e.g., loans). In one embodiment, the financial screening system 504 or the second data storage 538 archives all applications whether rejected or accepted. The archived applications may be audited as required by any standard auditing or accounting practices.

An applicant can readily and conveniently submit another application for any of the following reasons, among others: (1) to correct errors previously entered in a prior application; (2) to apply for a new or different incentive program than in a prior application; (3) to apply for new or different financial products than in a prior application; and (4) to apply after rejection of a prior application. The subsequent application may use prepopulation of fields based on gathered background data. Further, the subsequent application may reuse a credit report that has been provided by a credit bureau for a prior application, if the subsequent application is filed within some maximum duration (e.g., as defined by the financial provider) after the prior application. Unique application identifiers are assigned to any prior application, subsequent application, and any other application to distinguish one application from another.

In step S312, the communications interface 532 may make available the application data 534 to at least one respective financial provider associated with the financial product. For example, the communications interface 532 may present application data 534 to a financial provider associated with a financial product if the producer-applicant accepts an offer for financing or decides to affirmatively seek furtherance of the financing under an applicable financial product. However, in one embodiment, if the applicant does not accept an offer for financing or decides to reject furtherance of the financing under the applicable financial product, the communications interface 532 may not make available the application data 534 to the financial provider.

In a different embodiment, regardless of whether the applicant-producer accepts an offer for financing, if the applicant passes the financial screening process, the financial provider or lender is notified or given the opportunity to contact the applicant later for any follow-up or additional information required to approve a financial transaction (e.g., a loan). The financial provider's review of the application can be accommodated by various alternative or cumulative techniques. Under a first technique, the data processing system of the financial provider or elsewhere, the financial provider may view, print, and otherwise inspect applications on-line. Under a second technique, the applications may be downloaded to the financial provider. Under a third technique, the application is sent to the financial provider data processing system.

Under a fourth technique, the financial processing system 500 or the financial screening system 504 (financial screening system 504) may provide applications to a financial provider data processing system, such as back-office data processing system of the financial provider. For example, the financial screening system 504 may have a configurable output interface that is customized to support a legacy back-office data processing system. In one example, the output interface may provide an XML message to the back-office data processing system. The XML message facilitates an efficient transfer of data to the back-office data processing system (e.g., lending system) and eliminates the need for any duplicative, time-consuming manual entry.

In step S313, the financial screening system 504 presents the successful applicant with one or more applicable financial products (e.g., loans) to facilitate a transaction (e.g., purchase) of the goods (e.g., agricultural inputs) from the retailer. The financial provider may follow up with the applicant after the applicant is approved via the financial screening system 504 to check any additional information as a precondition to disbursement of funds or final approval of a particular applicant's application for a financing pursuant to a financial product.

Figure 4B:
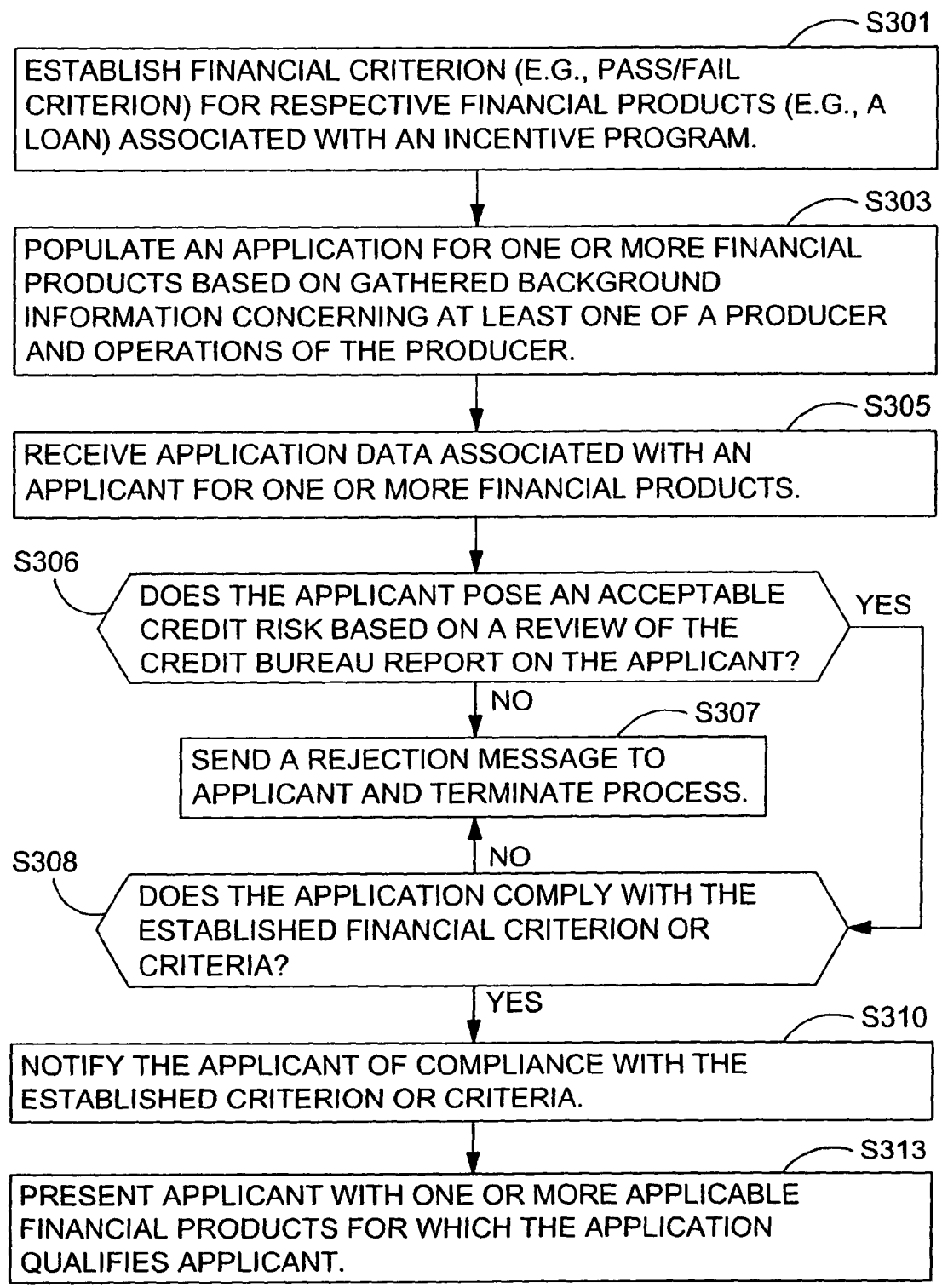
FIG. 4B is another example of a method for facilitating the incentive program in a subsequent phase following the preparatory phase of FIG. 3A or FIG. 3B.

FIG. 4B relates to a screening process for screening the creditworthiness of an applicant for a financial product associated with, or in support for, the selected incentive program of the method of FIG. 4B. Like reference numbers in FIG. 4A and FIG. 4B indicate like elements. The method of FIG. 4B is similar to the method of FIG. 4A except for steps S301, S303, S305, and S313 of FIG. 4B, which replace certain steps of the method FIG. 4A.

In step S301, a financial provider establishes one or more financial criteria (e.g., pass/fail criteria) for respective financial products (e.g., loans) associated with incentive programs. The definition of financial criteria set forth in the discussion of FIG. 4A applies equally here.

In step S303, an application for one or more financial products is populated based on gathered background information (e.g., crop planning data or demographic data) concerning at least one of a producer and the operations of a producer. The producer may complete one or more applications from the displayed financial products. A financial product may be associated with an electronic brochure that describes the financial product to facilitate the selection of the financial product.

In step S305, application data is received for one or more financial products. The producer may provide application data for an application for one or more financial products. For example, the producer may fill out a general or universal application that is compared against different custom financial criteria of each participating financial provider's financial products that are generally suitable for the producer's requirements.

In step S306, the credit module 528 executes a credit check to determine if the applicant poses an acceptable credit risk based on review of credit data (e.g., a credit bureau report). The credit module 528 may pull a credit report or rating from one or more credit rating agencies. The credit report or rating is one factor that may be used to determine whether or not to grant credit to the applicant; the credit report may be a determinative factor in denying credit in some situations. If the applicant poses an acceptable credit risk, the method of FIG. 4B continues in step S308. However, if the applicant does not pose an acceptable credit risk, the method of FIG. 4B continues in step S307.

In step S307, a rejection message is sent to the applicant via electronic communications or otherwise; and in turn, the process of FIG. 4B is terminated. The application is stored or archived (e.g., in a second data storage or second database) for later reference, even if the applicant's application is declined by one or more financial providers.

In step S308, the evaluator 530 determines whether the application complies with the established financial criteria (e.g., pass/fail criteria). The entire description of step S308 in FIG. 4A applies equally to FIG. 4B, as if set forth fully herein.

In step S310, the communications interface 532 notifies the applicant of compliance or noncompliance with the established criteria. If the application is rejected, the applicant may receive an electronic message, such as an adverse action letter or another electronic notification to the applicant. By using the integrated financial processing system 500 or the financial screening system 504, the financial provider may reduce the burden, personnel resources, and cost of screening applicants for financial products (e.g., loans). In one embodiment, the financial screening system 504 or the second data storage 538 archives all applications whether rejected or accepted. Accordingly, rejected applicants can readily and conveniently resubmit applications to correct errors for different financial products or for different incentive programs.

In step S313, in accordance with various techniques, one or more matching financial products may be presented to the producer. Under a first technique, the producer-applicant is presented with each product that matches the producer's needs. Under a second technique, the applicant is only presented with products from a selected financial provider. Under a third technique, the applicant is presented with one or more products with the lowest interest rates or all products below an interest rate ceiling.

Figure 5:
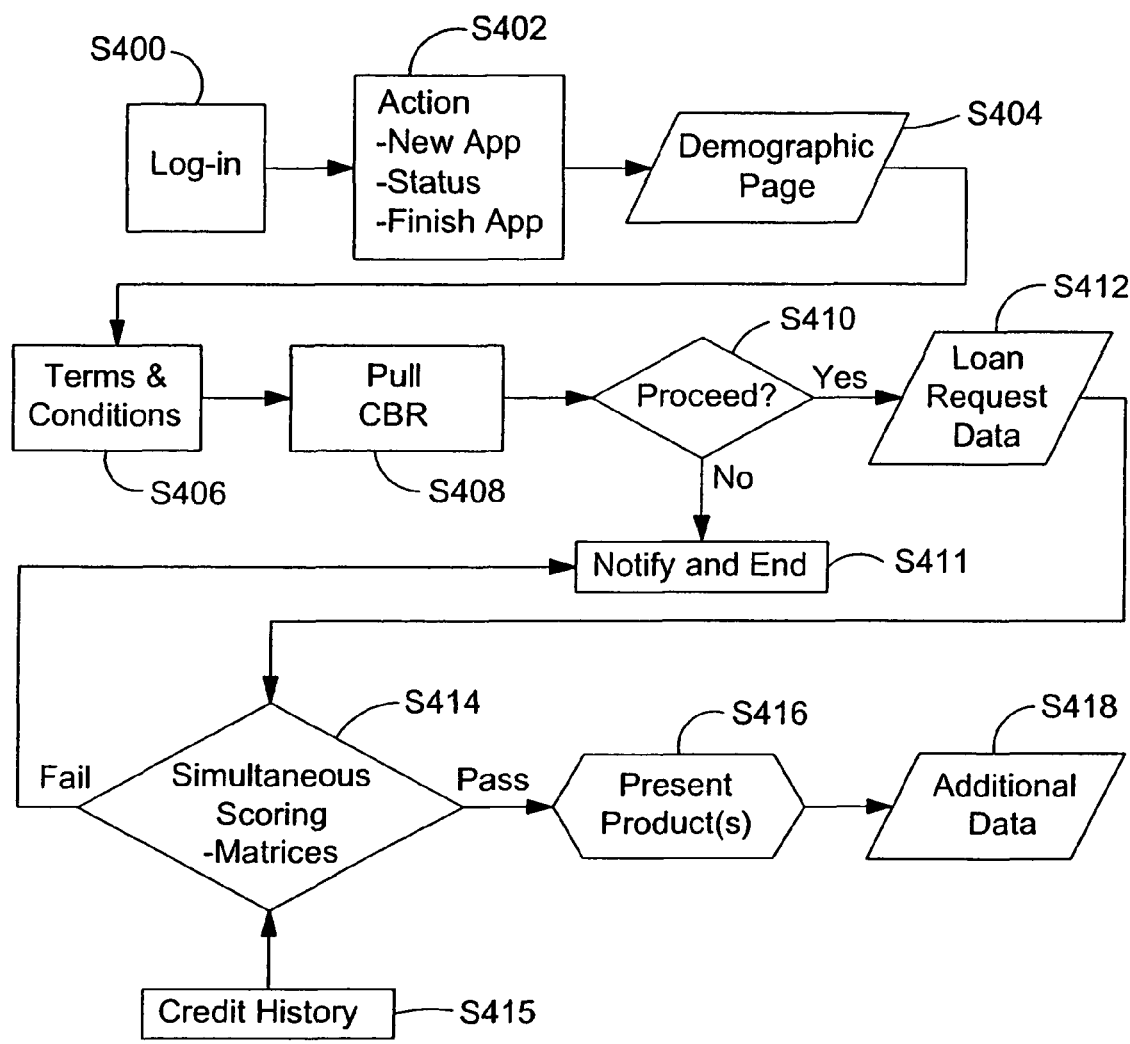
FIG. 5 is an alternate embodiment of a method for facilitating the incentive program.

FIG. 5 is a method of screening an application for financing pursuant to a financial product. The method of FIG. 5 starts in step S400.

In step S400, the producer-applicant logs into the financial screening system 504 to complete or work on an application for a financial product.

In step S402, the producer-applicant enters an action including any of the following: entering a new application for financing, checking the status of an application for financing, and finishing a saved application for financing.

In step S404, the producer enters, revises or reviews demographic information on the demographic information screen, such as the demographic information screen of FIG. 9A and FIG. 9B. In one embodiment, the application data capture module 526 may partially or entirely pre-populate the demographic information from previously-entered background information via at least one of the crop planner and the program manager 502. For example, the application for the financial product is repopulated with information from the program manager 502 by use of the user identifier (e.g., producer identifier and/or retailer identifier) as a reference to data within the first data storage device, such as the first database.

In step S406, the financial screening system 504 presents terms and conditions to the applicant. The terms and conditions define the contractual terms of the relationship between the applicant-producer and the financial provider. If the applicant does not accept the terms, the process of FIG. 5 may be terminated.

In step S408, the credit module 528 pulls or otherwise accesses credit data (e.g., a credit bureau report) for the producer based on the demographic information (e.g., social security number or federal tax identification number) entered in step S404. The credit bureau information may be used to support credit product matching, support credit decisions, and to substantiate or verify information inputted by the producer. The provision of credit check supports early decisions and efficient use of the resources of the financial processing system 500 by not further processing producers that fail the credit check. The credit check may use the social security number or tax identification number of the applicant.

In step S410, the financial processing system 500 or the evaluator 530 decides whether or not to continue the evaluation process for the application or to reject the application based on the credit data (e.g., credit bureau report) accessed in step S408. If the application is associated with satisfactory credit of the applicant, the method of FIG. 5 continues with step S412. However, if the application is associated with deficient credit of the applicant, the method continues with step S411.

In step S411, the applicant is notified of deficient credit data or otherwise appropriately notified; and the process of FIG. 5 terminates.

In step S412, the financial processing system 500 or the evaluator 530 accepts financial input data (e.g., loan data) from the producer to complete a loan application.

In step S414, the evaluator 530 applies scoring algorithm (e.g., simultaneous scoring matrices) to the inputted financial input data from the producer. The scoring model may be specific for each financial product (e.g., loan product). In one embodiment, the financial screening system 504 may simultaneously score the particular application against one or more financial products at the same time. The financial products may be offered by the same financial provider or different financial providers. In another embodiment, the financial screening system may simultaneously score the particular application against multiple financial providers' financial products.

In step S415, the financial screening system 504 may access an internal or external source of financial data (e.g., historical lender data, Dunn and Bradstreet reports, asset-based evaluations) or other financial information to assist in extending credit or a financial product to the producer.

In step S416, the communications interface 532 of the financial screening system 504 presents an offer of one or more financial products to the producer if the financial application is compliant with the financial criteria of the financial provider for the financial product, for which the producer-applicant is applying. The financial products offered to a retailer or a producer may be filtered in accordance with a retailer's preferences. The financial product may be customized based on reasons for the financial product (e.g., a loan), payment options, and scoring results. The producer may receive multiple credit product offerings for a single program and be given the choice to select a preferred lender or a lowest financing rate, for example.

In step S418, the financial screening system 504 may request additional information from the producer for the financial product prior to accepting the financial application or providing an offer of financing to the producer. The financial provider may gather additional information outside of the financial screening process. For example, the financial provider may conduct a personal interview of the producer, perform independent research or take other actions to minimize or lower the credit risk for the financial provider for extending the financial product or credit.

FIG. 6 represents an illustrative example of a search criteria screen or page outputted by the program manager 502. The search criteria screen of FIG. 6 may be displayed to a user (e.g., retailer or provider) via a retailer interface 542, a producer interface 546, or both. The search criteria screen supports entry of search terms to search for and retrieve applicable programs from the available programs 516 in the data storage (e.g., first database). The search criteria screen supports limiting the search in one or more of the following ways: program type, season, date, geographic location, state, country, available program sponsors, available product types, available crop types, and product description. The product description may be based on a word, phrase or set of alphanumeric characters.

The program types may include, but are not limited to, financing programs, application services, discounts, rebates, and refunds. The financing programs may relate to providing loans for growers or producers, for example.

In accordance with the search criteria screen of FIG. 6, the user (e.g., retailer or producer) selects one or more program sponsors from the available program sponsors, and those program sponsors become selected program sponsors that appear in the selected program sponsor's box to the right of the available program sponsor's box. Similarly, the user (e.g., retailer or producer) may select available product types from the available list of product types, and those product types selected become selected product types that appear in the selected product type's box to the right of the available product type's box. The user may select available crop types from the available list of crop types, and those crop types may be designated selected crop types.

As shown in FIG. 6, the available program sponsors comprise Sponsor Company A, Sponsor Company B, Sponsor Company C, and Sponsor Company D; the available product types comprise additive, equipment, feed, fertilizer, seeds, herbicides, and other products; and the available crop types comprise barley, corn, hay, oats, and other crops. The foregoing available program sponsors, available product types, and available crop types are merely shown in FIG. 6 and referenced herein for illustrative purposes; and other available program sponsors, available product types, and available crop types fall within the scope of the claims. The retailer or administrator of the incentive programs may change available program sponsors, available product types, and available crop types on a season-by-season basis or dynamically as market conditions indicate. Further, the producer may select selected programs 518, selected product types, and the selected crop types on a season-by-season basis or as market conditions indicate.

The user may search for particular incentive programs by making entries into the search criteria screen of FIG. 6, establishing a search based on crop planning data, or both. The user may input a product description and may select a program type. For example, the program type may constitute financing incentive programs. Once the retailer has entered all of the search criteria into the search criteria form, the retailer or user may activate the "find programs" button and the system will generate a list of the programs that match the search criteria. If the retailer or the purchaser is interested in purchasing a particular product under a particular incentive program, the user may enter the name of the product in the product description box of the search criteria screen.

FIG. 7A and FIG. 7B represent an illustrative example of a search results screen outputted by the program manager 502. The search results screen of FIG. 7A and FIG. 7B may be displayed to a user via a retailer interface 542, a producer interface 546, or both. From the search results screen, a user may view the incentive programs, meeting the criteria used in the search (e.g., entered into the search criteria screen of FIG. 6). The search results screen supports the display of one or more of the following items in response to search entries or queries into the search screen: program supplier, product type, program name, crop type, and season.

The search results may be displayed in a myriad of different arrangements, which may be displayed individually or collectively. Under a first arrangement, the search results may be displayed in tabular form in alphabetical order of the program sponsors, where the program supplier, product type, program name, crop type, and season may be displayed in different columns of the tabular format. Under a second arrangement, the search results may be sorted by program sponsor, program name, season or program type. Under a third arrangement, the search results screen may include a new search button to return to the search screen or to otherwise conduct a new search.

Under a fourth arrangement, in the program name portion of a table or the tabular format, the program names of the search results screen may be configured as hypertext links, hyperlinks, reference-icons or another linkage mechanism to detailed descriptions of the incentive programs, such as the program details screen. For example, the retailer may see additional details as later described in conjunction with FIG. 8A and FIG. 8B by clicking on the program name, which is in hypertext; in turn, the retailer will be taken to the program detail screen for the particular hyperlink that was activated.

Under a fifth arrangement, the search results screen may include, but need not include, one or more links to view the eligible financial products associated with the incentive program and a further application link to apply for the financial products.

FIG. 8A and FIG. 8B represent an illustrative example of a program details screen for a program. In response to the selection of the details of the incentive program, the program manager 502 presents a program detail screen, a program brochure or program details which may represent specific requirements for the incentive program. The program detail screen lists all of the agricultural products (e.g., crop protection products) that are eligible for the particular incentive program. The program detail screen may also describe the minimum purchase amounts and any additional requirements related to eligibility or compliance with the finance program, (e.g, for example, the finance program may require a minimum purchase of chemicals or seed to obtain financing). The details or terms of the financial product associated with the incentive program may include early repayment on the seed loan or other types of financing terms. In one embodiment, the financing details include a provider description, a purpose limitation for the financing, such as crop input financing, minimum finance amount, rate information (for example, the rate may be referenced to prime lending plus some increment) payment due information, and the application deadline.

In FIG. 8A and FIG. 8B, "Program F1" is shown as an exemplary incentive program. The incentive program may have one or more of following program attributes: eligibility requirements, rates, deadlines, minimum purchase requirements, notes, eligible products, incentive program type, and a financial product for crop input financing. The eligibility requirements may require a producer to purchase both its seed and crop protection products from the program sponsor to quality for the particular program. Further, the minimum purchase requirement may include a minimum seed purchase requirement and a minimum protection product requirement. The eligible products may comprise one or more of the following: brands of seeds and brands of crop protection products.

FIG. 9A and FIG. 9B represent an illustrative example of a demographic information screen, which may be displayed to a user via a producer interface 546, a retailer interface 542, or both. The demographic information may include one or more of the following: a business structure of the producer, a legal business name, a business address, a business zip code, a business county, country of residence of the producer, federal tax identifier, an e-mail address, a business phone number, years at current business address, whether the applicant is a U.S. citizen, the name of the applicant, the applicant's address, the business phone number, social security number, and date-of-birth. Further, if the business structure is other than a sole proprietor, the demographic information may include primary owner information, such as one or more of the following items: primary owner information, first name, middle initial, and last name of primary owner, date of birth, social security number, citizenship, percent owned, home address, home zip code, and home e-mail.

To access the demographic information screen, the user or producer may log on to the financial screening system 504 with the producer identifier and corresponding password via a producer interface 546 or a retailer interface. In one configuration, the producer provides an e-mail address, producer name, password, and confirmation of the password to log in to the financial screening system 504 for the first time. The new application button is clicked or activated to begin the application process. Upon activating the new application selection after logging on, the producer is then asked to complete the demographic information screen of FIG. 9A and FIG. 9B.

During the process of entering the demographic information or of completing the financial application, the producer may select save and finish later, such that the producer does not have to complete the application all at once. If the choice is made to save the application to complete later, the application will be assigned a number for later reference. The producer can write down the application number for future reference to return and complete the financial application process.

After the producer-applicant enters the demographic background information, the producer is taken to the terms and conditions screen. The producer must read and understand the terms and conditions before continuing with the loan application process. The producer is asked to certify that he has read and understood the terms and conditions outlined in the terms and conditions statement and the user must check or click on one or more buttons to indicate the agreement or acknowledgement that the producer has read and understood the terms and conditions.

FIG. 10 represents an illustrative example of a demographic information screen for a sole proprietor. The demographic information screen may display information similar to that of the primary owner information.

FIG. 11 represents an illustrative example of the loan application screen, which may be provided to a user (e.g., a producer) via a producer interface 546, a retailer interface 542, or both. The loan application screen allows a user to enter at least one of application data, loan data, equipment data, and financial applicant data 536. The application data (e.g., loan data) may comprise one or more of the following items: the purpose of the loan, equipment financing loan, operational loan, total selling price, cash down payment, loan amount requested, payment frequency, year started farming, major crop, income information, gross farm information, gross farm income, household net income, household net worth, total assets, and total liabilities. The equipment data may include at least one of equipment category, equipment make, used equipment status, and use of equipment. The producer data may comprise at least one of gross farm income, non-farm income, net worth, balance sheet information, total assets, and total liabilities.

After the applicant-producer agrees with the terms and conditions, the applicant is taken to the loan application screen of FIG. 11 from which the producer-applicant selects a type of financial product (e.g., loan) that the applicant is interested in from a menu or list of available financial products (e.g., loans). The loan types may include loans for both operational and equipment financing. The loan application may include the purpose fields for the loan, including the amount(s) that will be used for seed, chemicals, other crop inputs and services, cash rent, supplies (such as fuel, tires, maintenance, etc.), equipment repairs, livestock purchases, feed, and discretionary spending. The amounts include the amounts for livestock purchases, feed and livestock supplies or operating inputs. The user or applicant may select a payment frequency from a list, (e.g., the payment frequency may be semi-annual).

FIG. 12A and FIG. 12B represent a loan input screen for an equipment loan as a financial product. The equipment loan may comprise applicant-producer information, financial product or loan information, income information, and balance sheet information. The applicant-producer information comprises the business entity type of applicant, country, citizenship status, state, zip code, birth date, co-applicant information, credit score, applicant bankruptcy status, and time at residence.

FIG. 13A and FIG. 13B represent a supplemental loan input screen for an equipment loan as a financial product. The supplemental loan input screen may be displayed to a user via a producer interface 546, a retailer interface 542, or both. The supplement loan input screen may comprise one or more of the following items: equipment description, equipment model number, equipment serial number, equipment year, current equipment use hours, trade-in make, trade-in description, trade-in model number, trade-in serial number, trade-in year, current hours on trade-in, payoff lender name, payoff phone number, payoff account number, seller name, seller contact, address, city, state, zip, phone number, fax number, seller number, seller branch number, and seller e-mail address.

FIG. 14A and FIG. 14B represent a supplemental loan input screen for supplemental loan data including additional applicant information, such as spouse information, ownership status of residence, legal judgments against applicant, leases of equipment, crop liens, equipment liens, pending lawsuits, livestock ownership, checking account balance, net farm income, and crop insurance. Further, the supplemental loan input screen may include primary bank information, primary credit reference data, and additional company information.

FIG. 15A and FIG. 15B, collectively referred to as FIG. 15, represent an application review screen that may be transmitted or made available to the user-applicant via a user interface such as the producer interface 546 and the retailer interface 542. The applicant review screen provides the applicant with the previously entered demographic information, financial product or loan information, and equipment information such that the applicant may review the information for accuracy. Further, the applicant may edit the information by activating the edit button, which may return the applicant to a loan application input screen, for example. The applicant is given the opportunity to inspect the financial application (e.g., loan application) before submitting the loan application to the financial provider or the second data storage to search for possible loan offers based on the application. The applicant is given the opportunity to correct the information to promote accurate evaluation of the producer-applicant's application.

FIG. 16 represents an application complete screen which provides the applicant with feedback that the application is complete. The application feedback screen may provide the applicant with an assigned application number for tracking and reference purposes. The application feedback screen may contain a reference phone number and email address for customer service of the financial provider or another suitable service provider.

Figures 17, 17A, 17B:

FIG. 17A and FIG. 17B, collectively referred to as FIG. 17, represent an offer presentment screen in which one or more offers of financial products are presented to an applicant. The offer presentment screen may contain one or more offers or presentments of financial products from one or more financial providers. For example, as shown, the offer presentment screen shows offers from two lenders: iVesta Test Lender and John Deere Credit. Each offer may be associated with a product description, an amount, an interest rate, and a term. Further, a details hypertext link may be made available for an applicant to obtain further details on each financial product. The applicant may activate an accept button to accept or continue processing of the financing pursuant to a financial product or an offer therefor. Alternately, the applicant may activate the not-interested button or quit to select no financial product or offers.

The producer may look at the details of each of the offers. The producer may save the available offer list for future reference. The producer may save the offer and log off the computer to consider which offer would be best based on his judgment or that of a financial advisor (e.g., a certified public accountant).

Once the producer is confident in the choice, the user can log back on and will be directed to the offer page in which he can accept one of the offers, provided that the offer is still open. The offers may include: a description which is set forth in a matrix with a lender identifier, a product description, an amount, interest rates, duration, details, and a button that allows the user to accept the offer. The details may contain a details hypertext link that allows a user to click on the detail column of a particular lender product to see the details of the lender product on a detail page. The different offers may be grouped by offer or loan types, such as revolving or seasonal. The producer may have the option of selecting the duration of the loan. The details of the offer may include a page that lists a summary of the terms of the offer which include the rate, amount, and term in months. The detailed offer screen may also present the next steps that are necessary to obtain financing if the producer selects the offer. If the user or producer chooses to accept an offer, the producer is presented with a thank-you screen and a summary of the terms and conditions of the offer.

FIG. 18 represents a confirmation screen that provides a confirmation if the applicant selects one of the offerings from the offer presentment screen of FIG. 17. The confirmation screen verifies that the application process has been completed and supplies the producer with any necessary contact information and other specific instructions necessary to complete the financing process (e.g., loan process). The producer will be contacted by the lender, in most cases, based upon the information that the producer has entered into the system if the producer has accepted an offer. The lender may require additional information as a condition of granting the loan. Although John Deere Credit was selected pursuant to the offer presentment screen in the example of FIG. 18, financial providers other than John Deere Credit, fall within the scope of the claims. The confirmation may explain the next steps in the application process and provide details on the terms and conditions of the selected financial product.

FIG. 19 represents a product criteria menu screen where the financial provider (e.g., lender) can select to edit one or more of the following items: assignment of zip codes, pass/fail criteria, score criteria, criteria weights, test score, offer text, and supplemental questions. In one embodiment, the lender may be presented with an edit button to select any of the foregoing items. The product criteria menu screen may be presented to the financial product at a lender interface, for example.

The financial provider may customize its application (e.g., on-line credit application) for one or more financial products according to its preferences to reduce its financial risks. The program manager 502 and the financial screening system 504 may both collect information about a producer for screening whether the applicant-producer is suitable for a particular financial product. The financial provider may tailor applications or financial criteria associated therewith in accordance with the purpose of the loan, including a crop input loan application or an equipment loan application, for example. Financing incentives can be based upon the lender requiring specific use of the loan proceeds, such as purchase of a particular type of agricultural equipment.

FIG. 20 represents a credit product details screen that may allow a lender to enter, modify, edit or delete features of the financial product (e.g., loan). For example, the product data or attributes of the financial product may comprise one or more of the following: application type, product type, product name, lender product code, approval type, interest type, interest rate range, term, product effective date, additional terms, and whether the financial product is associated with, or limited to, a particular program. If the financial product is limited to a particular program, only an applicant that selects the products in the incentive program can obtain the financial product from the financial provider. The financial provider may assign a geographic region (e.g., by country, state, county or postal service zip code) in which the product offering will be offered. The financial provider may limit the product availability by geographic area to mitigate risks, for legal reasons, marketing reasons or any other lawful reason.

FIG. 21A through FIG. 21G, inclusive, represent a pass/fail criteria assignment screen, which a lender may access via a lender interface, for example. The pass/fail criterion or criteria may be configured in accordance with several alternative techniques which may be employed cumulatively.

Under a first technique, a pass/fail criteria may have an acceptable minimum value and an acceptable maximum value. The minimum value and the maximum value are independent of each other. The pass/fail criteria may comprise one or more of the following: requested loan amount, years in farming, gross farm income, total assets, net worth, years at current address, age of applicant, debt ratio, debt/equity ratio, income, loan request/net worth, percent loan-to-value, and credit bureau score.

Under a second technique, a pass/fail criteria may be configured to reject the applicant or application if a certain condition is present. For example, the pass/fail criteria may reject an application or applicant for any of the following reasons: (1) if the applicant is not a U.S. citizen; (2) the applicant does not live in the U.S.; (3) if the equipment is used; (4) if the equipment financed is used or old; (5) if the applicant has a co-applicant; or (6) if the applicant has had a bankruptcy. The financial provider may customize the pass/fail criterion or criteria to reject or not to reject (as opposed to accepting) applicants that have certain conditions.

Under a third technique, a pass-fail criteria may be configured to include various types or categories of equipment for a financial product. For example, a lender may elect to extend financing to purchases of tractors, but deny the availability of financing for irrigation equipment. Additional categories of equipment are shown. The pass/fail criteria may be based on equipment category, equipment use, equipment make, and major crops to the extent such actions are lawful.

FIG. 22 represents a score range normalization screen for a particular financial product. The financial provider may establish the score range for a financial criteria (e.g., credit report score). The normalized scores are listed in tabular format on the left side (e.g., 5 through 0), whereas the corresponding actual score ranges for the financial criteria are listed to the right of the normalized scores. In one example, one column of the actual score range represents minimum actual values, whereas the other column represents maximum actual values for the score range. The financial provider may establish and save the scoring ranges or values to be applied for evaluation of one or more financial applications.

FIG. 23 represents a criteria weight assignment screen which the financial provider may access via a lender interface. The financial provider may access the criteria weight assignment screen to assign a weight to a corresponding criteria type. The weights determine the relative importance of the different criteria in the financial screening process. The sum of all of the weights shown equals one-hundred percent. The criteria weight assignment screen also allows the financial provider to assign an overall passing score for an application to a financial product. In one embodiment, the overall passing score represents an automatic offer score, which if exceeded, will trigger the automatic sending of an offer to the applicant for the financial product. In another embodiment, the overall passing score represents a review score, which if exceeded, will trigger a review process by the financial provider. During the review process, the financial provider can obtain additional information before making a commitment to the applicant or accepting the applicant's application.

FIG. 24 represents an additional term screen in which the financial provider can add an additional term to the criteria for the financial product. The additional term may be formatted to include a label and a description of information that is required by the applicant. Accordingly, the financial provider can customize the financial screening processing or the lending process to minimize risk, reduce protracted transaction times, and reduce the transaction costs.

The financial processing system 500 and method facilitates the promotion and marketing of incentive programs for a financial provider, while providing the convenience of one-stop shopping for agricultural goods and financing for a producer.

The program manager 502 includes processing of the following information: demographic data entry into the program manager 502, terms/conditions of programs, product selection data, product matching inputs, and supplemental questions. The program manager 502 dynamically presents incentive programs based on retailer preferences or marketplace factors. The program manager 502 provides an interface between a crop planning tool and program manager 502 to leverage existing computational resources and to avoid duplicative clerical data entry. Accordingly, the producer can conveniently and accurately provide crop plan data for a transaction in the agricultural goods and the incentive program applicable thereto, without being susceptible to, human clerical errors or foibles of human memory.

The financial screening system 504 dynamically presents financial screening or available credit to a loan applicant based on the preference of the financial provider or market place factors. The financial screening system 504 supports generally simultaneous scoring of applicants and matching of available credit to applicants. Further, the financial screening system 504 is arranged to efficiently use computational resources and communications bandwidth by early decision processes. For example, the financial screening system 504 pulls credit data (e.g., a credit report) prior to requesting loan input data other than general background data 522 to conserve computational resources for other customers or potential customers.

The program manager 502 is integrated with the financial screening system 504 such that background data 522 and other data from the program manager 502 is readily transferred to the financial screening system 504. The program manager 502, the financial screening system 504, or both, may have interface components to facilitate the integration and data exchange. Further, the system level or operating system of the financial processing system 500 may support the exchange of data between the program manager 502 and the financial screening system 504.

The financial processing system 500 may be used by retailers, producers, and financial providers. Retailers sell or market goods or agricultural products via the incentive programs. The financial provider provides or markets loans or other financial products that promote a transaction pursuant to the incentive program. The producer represents a purchaser or leaser of goods subject to the incentive program, a purchaser of goods outside the incentive program, an applicant for a financial product, and a loan to finance the purchase of goods. The integrated financial processing system 500 promotes accurate presentation and cost-effective generation of new loan activity for financial providers and lenders. The program manager 502 and financial screening system 504 are services that work together to improve the business process of identifying and securing advantageous financial options.

Although the integrated financial system and method has been described primarily with reference to producers and incentive programs tailored toward agricultural producers, in an alternate embodiment, the integrated financial system and method may be applied to any person or business entity who seeks financing for an incentive program. For example, the integrated financial system may be applied to consumer financing, commercial financing or real estate financing.

Having described the preferred embodiment, it will become apparent that various modifications can be made without departing from the scope of the invention as defined in the accompanying claims.

The invention claimed is:

1. A method for facilitating an incentive program via an electronic data processing system, the method comprising the steps of:
   establishing a library as a comprehensive list of available incentive programs, for agricultural input products targeted to producers of agricultural products, the library stored in a data storage device associated with the data processing system;
   selecting, by a particular retailer with a retail level of access to the data processing system, the available incentive programs from the library of incentive programs through the discretion of the particular retailer servicing a particular producer based on retailer preferences comprising a geographic region that the retailer services, historic sales, and a supplier relationship with one or more suppliers of the incentive programs, the retailer level of access being different from a producer level of access to the data processing system by the producers, the particular retailer controlling the level of access of the producers to the data processing system to support limiting accessible information to the producers to the selected available incentive programs;
   receiving crop planning data of the particular producer at the data processing system via an interface, the crop planning data comprising background data on the particular producer or the producer's operations;
   searching the library or its selected, available incentive programs based upon the received crop planning data to select a tailored list of candidate incentive programs from the established library of available incentive programs;
   making information accessible on or limited to the available candidate incentive programs in the tailored list to the particular producer via the interface;
   supporting selection of a preferential one of the candidate incentive programs via the interface; and
   transferring the crop planning data and incentive program data on the preferential one from a program manager for the incentive programs to a financial screening process of a financial screening system of the data processing system to reduce or eliminate duplicative reentry of the background data applicable to the incentive programs and the financial screening process associated with financing of the products via electronic communications, where an application data capture module populates an application for the financial product based on the gathered background data.

2. The method according to claim 1 wherein each one of the available incentive programs is selected from the group of programs consisting of a financing program, an equipment financing program, a promotional program, a sales discount program, a rebate program, a purchasing program, a leasing program, and a transactional program associated with a transaction in an agricultural input product.

3. The method according to claim 1 wherein the crop planning data comprises one or more of the following: a crop plan, background producer data, demographic data, a list of applicable agronomic inputs and corresponding quantities, a list of agricultural input products and corresponding quantities, a chemical treatment plan or regimen, a growing practices plan or regimen, a seed identifier, a seed quantity, and insecticide identifier, an insecticide quantity, a pesticide identifier, a pesticide quantity, a fungicide identifier, a fungicide quantity, a fertilizer identifier, and a fertilizer quantity.

4. The method according to claim 1 further comprising providing financing for a monetary difference between a funded amount of the preferential incentive program and a total requisite amount of a crop plan for a particular producer for a particular growing season.

5. The method according to claim 1 wherein the searching further comprises:
   searching for a match of program identifiers between crop planning data and program data of the available incentive program to identify candidate incentive programs.

6. The method according to claim 1 wherein the searching further comprises translating the crop planning data having at least a brand name into a generic name for comparison to program data associated with corresponding available incentive programs.

7. The method according to claim 1 wherein making information accessible comprises electronically sending data to the particular producer via a communications network.

8. The method according to claim 1 where making information accessible comprises providing the producer with access to specifications of the candidate incentive programs through a retailer interface.

9. The method according to claim 1 wherein the preferential one of the available programs is associated with one or more corresponding financial products for which a financial application is electronically accessible.

10. The method according to claim 1 wherein the transferring comprises formatting at least one of the crop planning data and the incentive program data into an standard file format capable of interpretation by the financial screening process.

11. A method for facilitating an incentive program via an electronic data processing system, the method comprising the steps of:
   establishing a library as a comprehensive list of available incentive programs, for agricultural input products targeted to producers of agricultural products, the library stored in a data storage device associated with the data processing system;
   selecting, by a particular retailer with a retail level of access to the data processing system, the available incentive programs from the library of incentive programs through the discretion of the particular retailer servicing a producer based on retailer preferences comprising a geographic region that the retailer services, historic sales, and a supplier relationship with one or more suppliers of the incentive programs, the retailer level of access being different from a producer level of access to the data processing system by the producers, the particular retailer controlling the level of access of the producers to the data processing system to support limiting accessible information to the producers to the selected available incentive programs;
   gathering background data on at least one of the producer and operations of the producer via an interface for communication to the data processing system;
   searching the library of available incentive programs based upon the gathered background data on the particular producer or the producer's operations to select a tailored list of available incentive programs from the established library;
   making information accessible on or limited to the available incentive programs in the tailored list to the producer via the interface;
   supporting selection of a preferential one of the available incentive programs via the interface; and
   transferring the gathered background data and selected incentive program data from a program manager for the incentive programs to a financial screening process of a financial screening system of the data processing system to reduce or eliminate duplicative reentry of the background data applicable to the incentive programs and the financial screening process associated with financing the products via electronic communications, where an application data capture module populates an application for the financial product based on the gathered background data.

12. The method according to claim 11 wherein each one of the available incentive programs is selected from the group of programs consisting of a financing program, an equipment financing program, a promotional program, a sales discount program, a rebate program, a purchasing program, a leasing program, and a transactional program associated with a transaction in an agricultural input product.

13. The method according to claim 11 wherein the background data comprises one or more of the following: background producer data, demographic data, information on the producer or the producer's operations, historical information on the producer's purchase of agricultural input products, biographical data on the producer, demographic data on the producer, historical financial information on the producer, and a transactional history of the producer with respect to agricultural equipment.

14. The method according to claim 11 further comprising providing financing for a monetary difference between a funded amount of the preferential incentive program and a total requisite amount of a crop plan for a particular producer for a particular growing season.

15. The method according to claim 11 wherein the searching further comprises:
   searching for a match of program identifiers between background data and program data of the available incentive program to identify candidate incentive programs.

16. The method according to claim 11 wherein the searching further comprises translating the background data having at least a brand name into a generic name for comparison to program data associated with corresponding available incentive programs.

17. The method according to claim 11 wherein making information accessible comprises electronically sending data to the particular producer via a communications network.

18. The method according to claim 11 where making information accessible comprises providing the producer with access to specifications of the candidate incentive programs through a retailer interface.

19. The method according to claim 11 wherein the preferential one of the available programs is associated with one or more corresponding financial products for which a financial application is electronically accessible.

20. The method according to claim 11 wherein the transferring comprises formatting at least one of the background data and the incentive program data into a standard file format capable of interpretation by the financial screening process.

21. A data processing system for facilitating an incentive program, the system comprising:
   a program management module for establishing a library of available incentive programs for a producer and for gathering background data on at least one of the producers and operations of the producer, for agricultural input products targeted to producers of agricultural products, the library stored in a data storage device associated with the data processing system, the available incentive programs selected, by a retailer with a retail level of access, from a comprehensive list of incentive programs through the discretion of a particular retailer servicing the producer based on retailer preferences comprising a geographic region that the retailer services, historic sales, or a supplier relationship with one or more suppliers of the incentive programs, the retailer level of access being different from a producer level of access to the data processing system by the producers, the particular retailer controlling the level of access of the producers to the data processing system to support limiting accessible information to the producers to the selected available incentive programs;
   a search engine for searching the library of available incentive programs based upon the gathered background data on the particular producer or the producer's operations to select a candidate list of candidate incentive programs from the library of available incentive programs;
   a selector for supporting selection of preferential one of the candidate incentive programs for a financial application; and
   a transferring agent for transferring the gathered background information and selected preferential incentive program from a program manager for the incentive programs to a financial screening process of a financial screening system of the data processing system to reduce or eliminate duplicative reentry of the background data applicable to the incentive programs and the financial screening process associated with financing the products, where an application data capture module populates an application for the financial product based on the gathered background data.

22. The system according to claim 21 further comprising a first data storage device for storing the gathered background data and selected program data associated with the preferential one; the transferring agent sending at least one of selected program data and background data from the first data storage device to a financial screening system.

23. The system according to claim 21 further comprising a user administration module for administering the available incentive programs and financing activities for one or more users by allowing a retailer to define any of the following: a user profile for a user of the financial processing system, a retailer profile, and a producer profile.

24. The system according to claim 21 further comprising a security module for providing the producer with access to one or more resources of the system after receiving a producer identifier, a corresponding producer identifier password, a retailer identifier, and a corresponding retailer identifier password.

25. The system according to claim 21 wherein the program manager comprises a crop planning interface for supporting the transfer of crop planning data, originated by a crop planner, to the program management module.

26. The system according to claim 25 wherein the crop planning data may include one or more of the following: a crop plan, background producer data, demographic data, a list of applicable agronomic inputs and corresponding quantities, a list of agricultural input products and corresponding quantities, a chemical treatment plan or regimen, a growing practices plan or regimen, a seed identifier, a seed quantity, an insecticide identifier, an insecticide quantity, a pesticide identifier, a fertilizer identifier, and a fertilizer quantity.

27. The system according to claim 1 wherein the searching further comprises returning the tailored list of the candidate incentive programs and potentially relevant incentive programs even if a submitted crop plan or query fails to satisfy a minimum purchase or minimum transaction requirement.

28. The method according to claim 1 further comprising the particular retailer limiting the incentive programs to certain providers among the suppliers.

29. The method according to claim 11 further comprising the particular retainer limiting the incentive programs to certain providers among the suppliers.

30. The system according to claim 21 further comprising the particular retailer limiting the incentive programs to certain providers among the suppliers.

31. The method according to claim 1 wherein the transferring comprises transferring, within the data processing system, the crop planning data and the incentive program data on the preferential one from the program manager to, the financial screening process of, the financial screening system after successful authentication of a user identifier and a corresponding password.

32. The method according to claim 11 wherein the transferring comprises transferring, within the data processing system, the gathered background data and the selected incentive program data from the program manager to, the financial screening process of, the financial screening system, after successful authentication of a user identifier and a corresponding password.

33. The system according to claim 21 wherein the transferring agent is arranged to transfer, within the data processing system, the gathered background information and selected preferential incentive program from the program manager to, the financial screening process of, the financial screening system after successful authentication of a user identifier and a corresponding password.

* * * * *